(12) United States Patent
Ueno et al.

(10) Patent No.: US 11,609,308 B2
(45) Date of Patent: Mar. 21, 2023

(54) METHOD AND APPARATUS FOR IDENTIFYING A LIGHT RECEIVING AREA AND OPTICALLY MEASURING DISTANCE

(71) Applicant: DENSO CORPORATION, Kariya (JP)

(72) Inventors: Akifumi Ueno, Kariya (JP); Isamu Takai, Kariya (JP)

(73) Assignee: DENSO CORPORATION, Kariya (JP)

( * ) Notice: Subject to any disclaimer, the term of this patent is extended or adjusted under 35 U.S.C. 154(b) by 973 days.

(21) Appl. No.: 16/282,756

(22) Filed: Feb. 22, 2019

(65) Prior Publication Data

US 2019/0265333 A1 Aug. 29, 2019

(30) Foreign Application Priority Data

Feb. 23, 2018 (JP) .............................. JP2018-030457

(51) Int. Cl.
| | |
|---|---|
| G01S 7/48 | (2006.01) |
| G01S 17/08 | (2006.01) |
| G01S 17/931 | (2020.01) |
| G01S 17/10 | (2020.01) |

(52) U.S. Cl.
CPC ............ G01S 7/4808 (2013.01); G01S 17/08 (2013.01); G01S 17/10 (2013.01); G01S 17/931 (2020.01)

(58) Field of Classification Search
None
See application file for complete search history.

(56) References Cited

U.S. PATENT DOCUMENTS

| | | | | |
|---|---|---|---|---|
| 2010/0157280 A1* | 6/2010 | Kusevic | ................ | G01S 7/4972 356/4.01 |
| 2011/0194097 A1 | 8/2011 | Yamaguchi et al. | | |
| 2018/0292304 A1* | 10/2018 | Otsuka | ................. | G06V 20/695 |
| 2018/0341020 A1* | 11/2018 | Magee | .................... | G01S 17/42 |
| 2019/0086542 A1* | 3/2019 | Kubota | ................... | G01S 17/18 |
| 2019/0271767 A1* | 9/2019 | Keilaf | .................. | G01S 7/4815 |
| 2019/0331771 A1* | 10/2019 | Iguchi | ................... | G01S 7/4868 |

FOREIGN PATENT DOCUMENTS

| | | |
|---|---|---|
| JP | 2007-240208 A | 9/2007 |
| JP | 2012-060012 A | 3/2012 |
| JP | 2014-077658 A | 5/2014 |
| JP | 2014-081254 A | 5/2014 |
| JP | 2016-176750 A | 10/2016 |
| JP | 2018-179974 A | 11/2018 |

* cited by examiner

Primary Examiner — Edemio Navas, Jr.
(74) Attorney, Agent, or Firm — Maschoff Brennan

(57) ABSTRACT

In an apparatus, each of light receiving elements outputs an intensity signal based on a corresponding intensity of return light from a measurement space. The return light includes reflected light reflected based on reflection of the measurement light by a target object. An identifying unit identifies a light receiving area in the light detection region as a function of the intensity signals of the respective light receiving elements. The light receiving area is based on specified light receiving elements in the plurality of light receiving elements. The specified light receiving elements are arranged to receive the reflected light. A distance measuring unit measures the distance of the target object in accordance with the intensity signals received by the specified light receiving elements.

13 Claims, 20 Drawing Sheets

(H × V) PIXELS

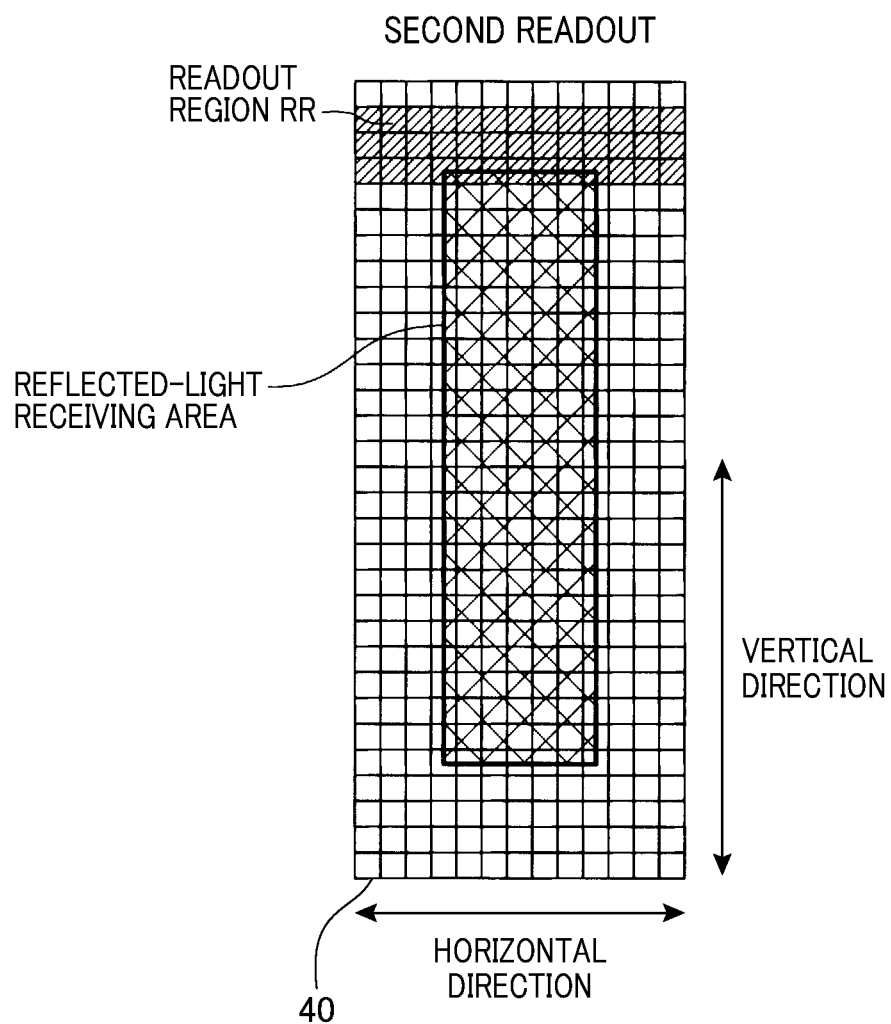

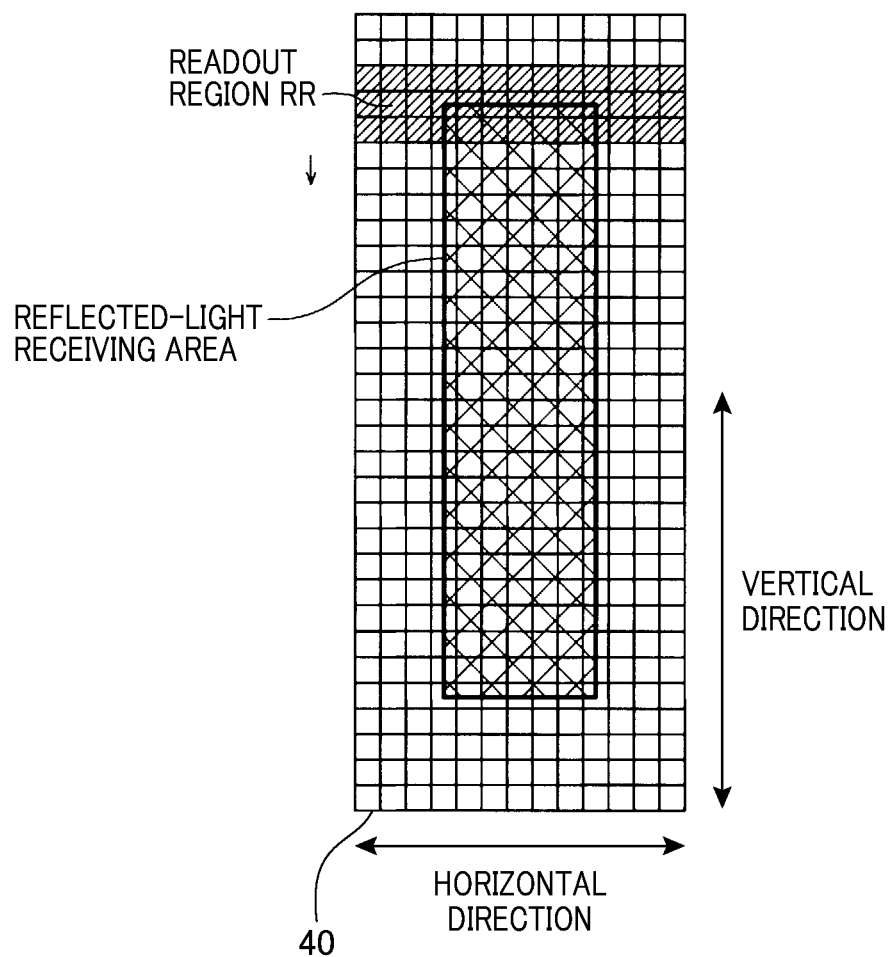

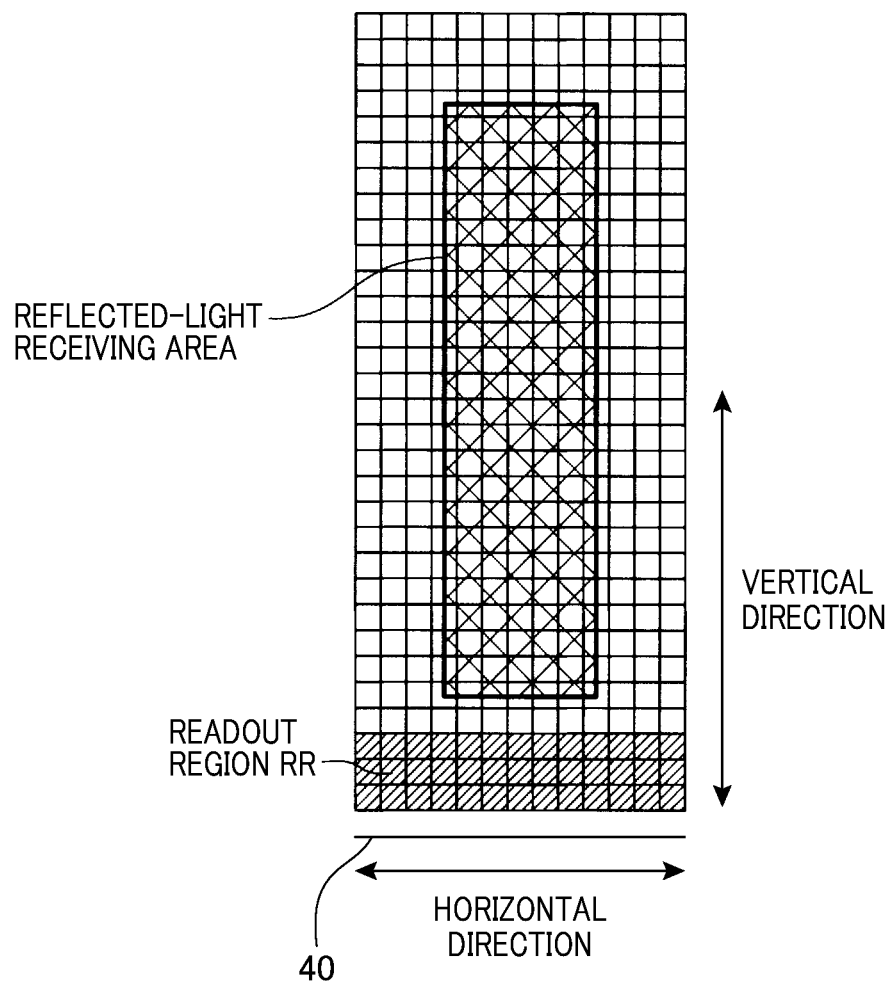

CUMULATIVE SUM IMAGE SG

DETERMINE LIGHT RECEIVING
AREA BASED ON LOWER PORTION OF
CUMULATIVE SUM IMAGE SG

LOCATE RECTANGULAR
PIXEL FIELD HAVING SIZE OF
LIGHT RECEIVING AREA (P × Q)

IDENTIFIED LIGHT RECEIVING AREA (P × Q)

METHOD AND APPARATUS FOR IDENTIFYING A LIGHT RECEIVING AREA AND OPTICALLY MEASURING DISTANCE

CROSS REFERENCE TO RELATED APPLICATIONS

This application is based on and claims the benefit of priority from Japanese Patent Application 2018-030457 filed on Feb. 23, 2018, and the disclosure of this application is incorporated in its entirety herein by reference.

TECHNICAL FIELD

The present disclosure relates to methods and apparatuses for optically measuring a distance of a target object.

BACKGROUND

In recent years, we have increased our demands for obtaining optical measurement technologies that are capable of measuring a distance of a target relative to our own vehicle faster; the distance of a target object can be used for autonomous driving of the own vehicle and/or avoiding a collision of the own vehicle with the target object.

SUMMARY

According to a first exemplary aspect of the present disclosure, there is provided an apparatus for performing a measurement task of optically measuring a distance of a target object. The apparatus includes a light receiving unit including, in a light detection region thereof, a plurality of light receiving elements to which return light from a measurement space is incident. Each of the plurality of light receiving elements is configured to output an intensity signal based on a corresponding intensity of the return light. The return light includes reflected light reflected based on reflection of the measurement light by the target object. The apparatus includes an identifying unit configured to identify a light receiving area in the light detection region as a function of the intensity signals of the plurality of respective light receiving elements. The light receiving area is based on specified light receiving elements in the plurality of light receiving elements, the specified light receiving elements being arranged to receive the reflected light. The apparatus includes a distance measuring unit configured to measure the distance of the target object in accordance with the intensity signals received by the specified light receiving elements.

According to a second exemplary aspect of the present disclosure, there is provided a method of optically measuring a distance of a target object. The method includes causing each of plurality of light receiving elements, to which return light from a measurement space is incident, to output an intensity signal based on a corresponding intensity of the return light, the return light including reflected light reflected based on reflection of the measurement light by the target object. The method includes outputting an intensity signal based on a corresponding intensity of the return light, and identifying a light receiving area in the light detection region as a function of the intensity signals of the plurality of respective light receiving elements. The light receiving area is based on specified light receiving elements in the plurality of light receiving elements, the specified light receiving elements being arranged to receive the reflected light. The method includes measuring the distance of the target object relative to the apparatus in accordance with the intensity signals received by the specified light receiving elements.

BRIEF DESCRIPTION OF THE DRAWINGS

Other aspects of the present disclosure will become apparent from the following description of embodiments with reference to the accompanying drawings in which:

FIG. 9B is a diagram schematically illustrating that the horizontal selector shifts the readout region by one pixel-row in a vertical direction, and readout of the pulse signals from the readout region is carried out at the second time;

FIG. 9C is a diagram schematically illustrating that the horizontal selector further shifts the readout region by one pixel-row in the vertical direction, and readout of the pulse signals from the readout region is carried out at the third time;

FIG. 9D is a diagram schematically illustrating that the horizontal selector selects the readout region at the lower end of the light receiving array, and readout of the pulse signals from the readout region is carried out at the N-th time;

DETAILED DESCRIPTION OF EMBODIMENT

Inventor's Viewpoint

Figure 1:
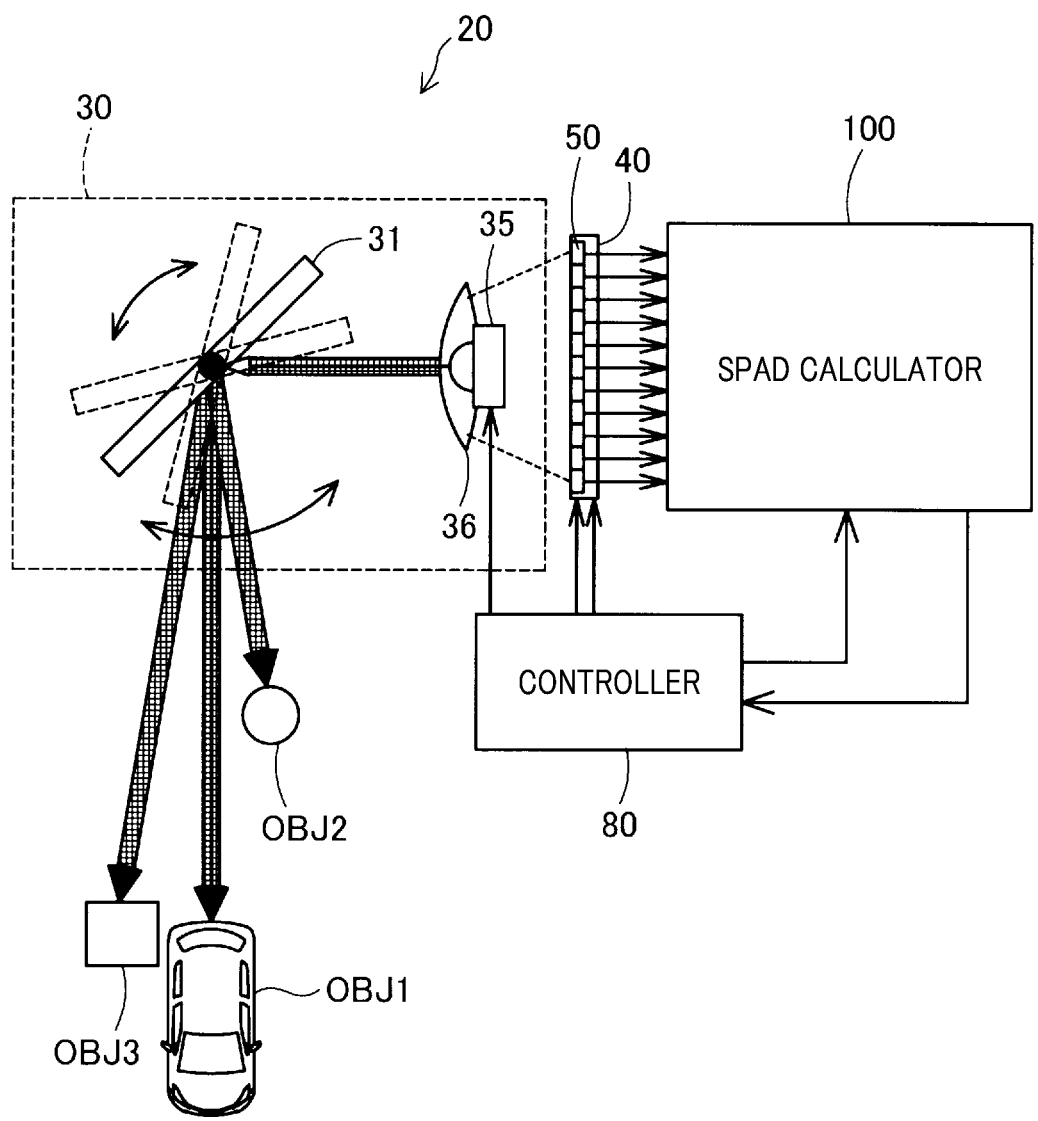
FIG. 1 is a block diagram schematically illustrating an example of the overall configuration of an optical distance measuring apparatus according to the first embodiment of the present disclosure.

One of optical measurement technologies measures time during which light, such as laser light, irradiated from a light source is propagated to a target object and, after being reflected by the target object, back to, for example, a light receiving device. The measurement technology thus measures, based on the measured time, a distance of the target object relative to the light receiving device.

Such a measurement technology often uses, as the light receiving device, avalanche photodiodes (APD) or PIN photodiodes arranged as a two-dimensional array; each of these photodiodes has a high responsivity and a high detectability to input light.

A photon of reflected light incident on an APD causes the APD to generate pairs of a positive hole and an electron, which will be referred to as hole-electron pairs. The holes and electrons of the hole-electron pairs are accelerated in a high electrical field to impact atoms to thereby knock electrons from their atoms, resulting in additional electron-hole pairs being created. This feature, which will be called the avalanche phenomenon, makes it possible to amplify the reflected light. Measurement apparatuses, which need to measure a distance of a distinct target object generating weak reflected light, often use such APDs, and amplify the weak reflected light from the distinct target object.

An APD is designed to operate in a linear mode or a Geiger mode. In the liner mode, an APD operates with a reverse-bias voltage equal to or less than a predetermined breakdown voltage, and, in the Geiger mode, operates with a reverse-bias voltage exceeding the breakdown voltage. In an APD operating in the liner mode, the number of hole-electron pairs, which move out of the electrical field to disappear is greater than the number of hole-electron pairs, which are newly created, resulting in the avalanche phenomenon of hole-electron pairs being naturally terminated. This feature leads to the fact that an output current from an APD is proportional to the quantity of input light thereto.

Otherwise, an APD operating in the Geiger mode causes the avalanche phenomenon based on a single photon incident on the APD, resulting in the APD having higher sensitivity of incident light. Such an APD operating in the Geiger mode will also be called a single photon avalanche diode (SPAD).

There is a conventional technology disclosing a fast distance measuring apparatus, in other words, a fast ranging apparatus, using such SPADs two-dimensionally arranged as an array. The fast distance measuring apparatus measures time of flight (TOF) during which light, such as laser light, irradiated from a light source is propagated to a target object and, after being reflected by the target object, back to, for example, the SPAD array. Then, the distance measurement measures, based on the measured TOF, a distance of the target object relative to the SPAD array.

As described above, these optical distance measuring technologies are each configured to receive, via an optical system, reflected light from a target object by a light detection region comprised of light receiving elements, such as SPADs, two-dimensionally arranged as an array such that the reflected light focuses on a predetermined area of the light detection region as an image. The optical system, which is for example comprised of optical elements, is in proper alignment with the predetermined area of the light detection region. Misalignment of the optical system with the predetermined area of the light detection region however may cause each optical distance measuring technology to obtain an erroneous distance measurement of a target object. Misalignment of the optical system may be due to various factors including, for example, manufacturing variations, distortions, positional deviations, and/or aged deteriorations of the optical elements; the distortions and positional deviations are caused by changes in temperature.

That is, misalignment of the optical system with the predetermined area of the light detection region may reduce the accuracy of measuring the distance of a target object. Various distance measuring apparatuses, which use the SPADs or other light receiving elements, such as high-sensitivity charge-coupled devices (CCD) or photon sensors with electron-bombarded multiplication, may result in this issue.

Embodiment

From the above inventor's viewpoint, the following describes embodiments of the present disclosure with reference to the accompanying drawings. In the embodiments, like parts between the embodiments, to which like reference characters are assigned, are omitted or simplified to avoid redundant description.

First Embodiment

Figure 2:
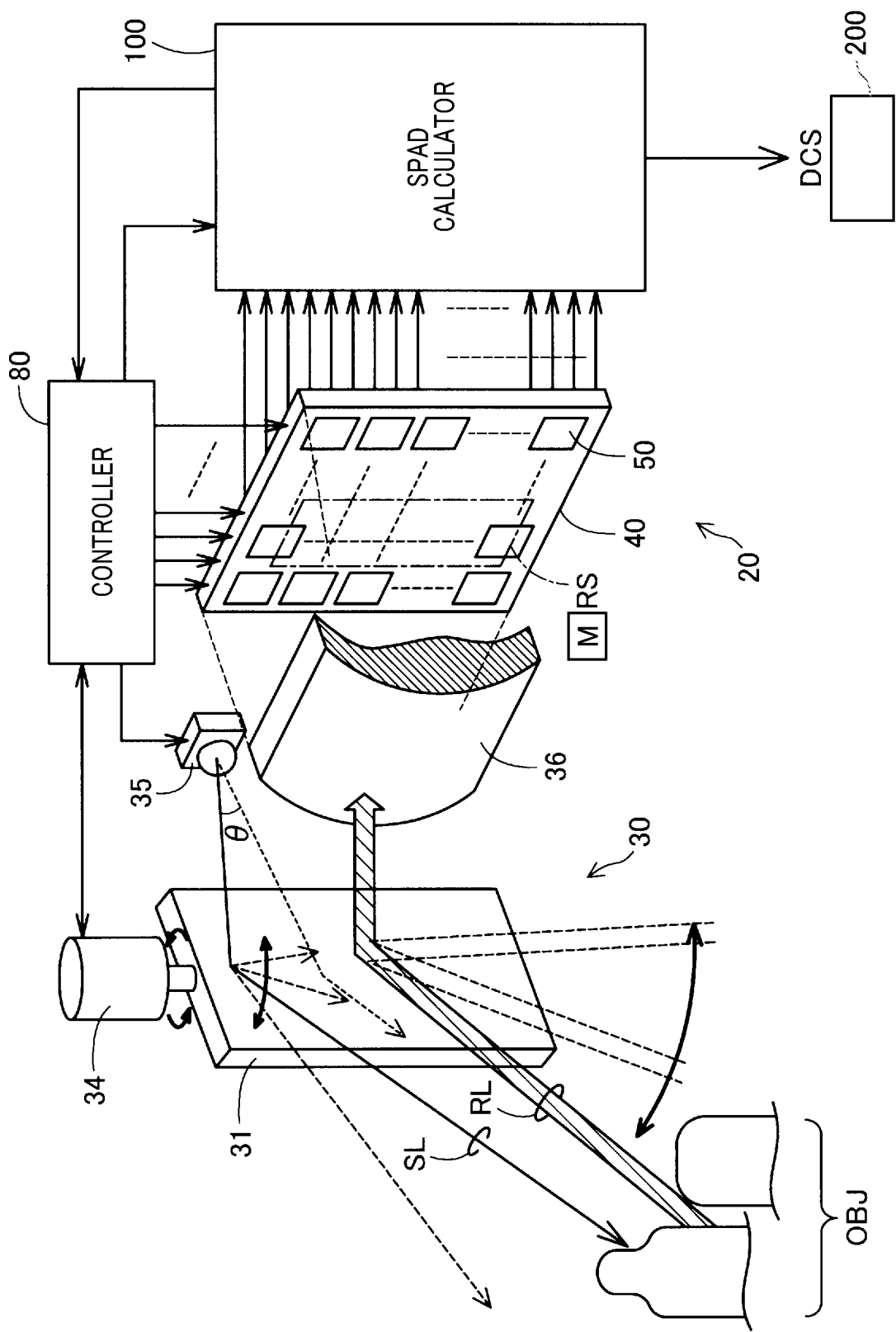
FIG. 2 is a perspective view schematically illustrating an example of the configuration of an optical system illustrated in FIG. 1.

Schematic Configuration of Optical Distance Measuring Apparatus of First Embodiment The following describes an example of the configuration of an optical distance measuring apparatus 20 according to the first embodiment with reference to FIGS. 1 and 2.

Referring to FIGS. 1 and 2, the optical distance measuring apparatus 20, which will be referred to simply as a measuring apparatus 20, includes an optical system 30, a light receiving array 40, an SPAD calculator 100, and a controller 80.

The optical system 30 is configured to transmit laser light, such as a laser pulse, to each of distance-measurement target objects, which will be referred to as target objects, and receive light reflected from each of the target objects. The light receiving array 40 is comprised of light receiving elements, i.e. avalanche photodiodes, 50 arranged as a two-dimensional array; the light receiving elements 50 constitute a light detection region of the light receiving array 40. The light receiving array 40 is configured to receive, for each of the target objects, the reflected light sent through the optical system 30 on the light detection region thereof.

The SPAD calculator 100 is configured to calculate the distance of each of the target objects relative to the measuring apparatus 20 in accordance with distance information about the corresponding target object output from the light receiving array 40. The controller 80 controls the components 30, 40, and 100 of the measuring apparatus 20.

The target objects whose distances are measured by the measuring apparatus 20 include other vehicles, pedestrians, and obstacles if the measuring apparatus 20 is installed in a vehicle. FIG. 1 illustrates, as an example of these target objects, three target objects OBJ1, OBJ2, and OBJ3, and FIG. 2 collectively illustrates these target objects OBJ1, OBJ2, and OBJ3 as a target object OBJ.

The optical system 30 includes, as a light transmission unit for transmitting measurement light to a predetermined measurement space, a laser device 35, a mirror 31, a motor 34, and a lens 36. The laser device 35 outputs, from its light output surface, laser light as measurement light under control of the controller 80.

The mirror 31 has, for example, a substantially rectangular plate-like shape, and has opposing first and second major surfaces, the first major surface of which serves as a light reflection surface capable of reflecting light. The mirror 31 is arranged such that the light reflection surface faces the light output surface of the laser device 35.

The motor 34 has a rotating shaft through which a longitudinally center portion of the mirror 31 is penetrated. The motor 34 is configured to rotate the rotating shaft to thereby rotate the light reflection surface of the mirror 31 together with the rotating shaft.

In particular, the laser device 35 outputs the laser light having a beam spread angle θ (see FIG. 2) along the direction of the rotating shaft of the motor 31, i.e. the rotation axis of the mirror 31. The laser light output from the laser device 35 is incident to the light reflection surface of the mirror 31, so that the laser light is reflected by the light reflection surface of the mirror 31. That is, rotating the mirror 31 about the rotation axis thereof enables the light reflection surface of the mirror 31 to reflect the incident laser light, so that the reflected laser light, i.e. the echo, is transmitted to a direction defined by a rotation angle of the mirror 31. This means that the assembly of the mirror 31 and the motor 34 scans the laser light having the laser spread angle θ output from the laser device 35 along a direction perpendicular to the direction of the rotation axis of the mirror 31. In FIG. 2, the laser light output from the laser device 35 is assigned with a reference character SL.

Note that the direction of the rotation axis of the mirror 31 will be for example referred to as a vertical direction of the measuring apparatus 20, and the direction perpendicular to the vertical direction of the measuring apparatus 20 will be for example referred to as a horizontal direction of the measuring apparatus 20.

Because the light reflection surface of the mirror 31 is located to face the light output surface of the laser device 35, the assembly of the mirror 31 and the motor 34 is able to scan, in principle, the laser light SL within the range of 180°. It is assumed that a reference plane is defined to pass through the rotation axis of the mirror 31 while being perpendicular to the light output surface of the laser device 35. When the light reflection surface of the mirror 31 is located to be perpendicular to the reference plane, the rotational angle of the motor 31 is defined at a reference angle of 0°.

Actually, because the optical system 30 is installed in an unillustrated case such that the laser light is output through a predetermined laser output opening of the case, the scannable angular range of the laser light SL output from the mirror 31 is limited to be the range from 90° to 120°.

That is, the laser spread angle θ and the scannable angular range of the laser light SL output from the optical system 30 constitute a substantially rectangular scannable space defined by the above configuration of the optical system 30.

The motor 31 incorporates therein a sensor for detecting the timing when the rotational angle of the motor 31 reaches the reference angle; the timing when the rotational angle of the motor 31 reaches the reference angle will be referred to as a reference angle timing. The sensor sends, to the controller 80, the reference angle timing of the motor 31. The controller 80 is therefore capable of detecting a currently scanning region of the laser light SL in the scannable space in accordance with the rotational speed of the motor 31 and the reference angle timing of the motor 31. The scannable space of the optical system 30 is defined as a distance measurement space of the measuring apparatus 20.

The laser light SL transmitted from the optical system 30 to the distance measurement space of the measuring apparatus 20 is reflected by a target object OBJ when the target object OBJ is located in the distance measurement space. Because the laser light SL is reflected diffusely by the outer surface of the target object OBJ, a part of reflected laser light returns back to the incident direction of the laser light SL to the target object OBJ as reflected light RL. The reflected light RL returning back in the incident direction of the laser light SL is propagated in the direction opposite to the transmitting direction of the laser light SL so as to be reflected by the mirror 31. The reflected light RL reflected by the mirror 31 is incident to the lens 36, and the lens 36 causes the incident reflected light RL to focus on the light detection region of the light receiving array 40. This results in an image RS formed on the light detection region of the light receiving array 40; the shape of the image RS is defined based on the beam spread angle θ of the laser light SL. The image RS based on the reflected light RL will also be referred to as a reflected-light image RS hereinafter.

The location of the reflected-light image RS on the light detection region of the light receiving array 40 is determined depending on the alignment of the optical system 30 with the light detection region of the light receiving array 40. This therefore may result in the location of the reflected-light image RS on the light detection region of the light receiving array 40 varying within a predetermined assembly accuracy of the optical system 30 and the light receiving array 40. Misalignment of the optical system 30 due to distortions and/or positional deviations of at least one of the optical elements 31, 34, and 35 caused by changes in temperature may also result in the location of the reflected-light image RS on the light detection region of the light receiving array 40 varying.

The measuring apparatus 20 set forth above is configured such that the laser light SL output from the laser device 35 is propagated to the target object OBJ, and after being reflected by the target object OBJ, back to the optical apparatus 20. That is, the measuring apparatus 20 set forth above is configured such that the laser light SL output from the laser device 35 makes round-trip between the optical apparatus 20 and the target object OBJ. Because the round-trip time of the laser light SL is extremely short, when the laser light SL output from the laser device 35 has returned to the measuring apparatus 20, the rotational angle of the mirror 31 is regarded to be unchanged. Thus, as illustrated in FIG. 2, the laser light SL reflected by the mirror 31 is propagated to be reflected by the target object OBJ as the returning laser light RL, and the returning laser light RL propagated back to the same mirror 31 is reflected by the same mirror 31 so as to return to the lens 36. The optical system 30 configured set forth above will be referred to as, for example, a coaxial optical system.

As described above, the light receiving array 40 is comprised of the light receiving elements 50 arranged as a two-dimensional array; the light receiving elements 50 constitute the light detection region of the light receiving array 40. A signal output from each light receiving element 50 constitutes a part of an image, so that the light receiving elements 50 respectively serve as pixels that form an image whose size is within the light detection region of the light receiving array 40.

Figure 3:
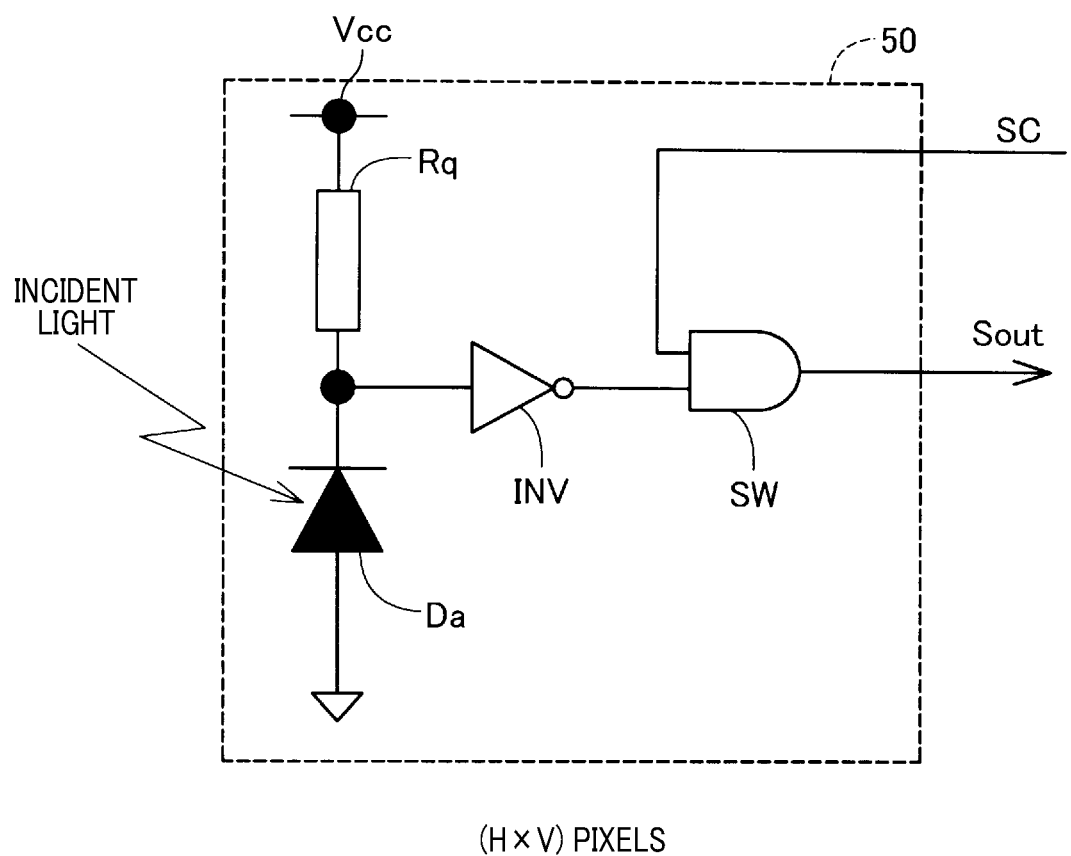
FIG. 3 is a circuit diagram schematically illustrating an example of the structure of a light receiving element of a light receiving array illustrated in FIG. 2.

FIG. 3 is an equivalent circuit of each light receiving element 50.

Referring to FIG. 3, each light receiving element 50 is comprised of a quench resistor Rq, an avalanche photodiode Da, an inverter INV, and an AND circuit SW. The quench resistor Rq has opposing first and second ends, and the first end of the quench resistor Rq is connected to a power source Vcc, and the second end of the quench resistor Rq is connected to the cathode of the avalanche photodiode Da, and the anode of the avalanche photodiode Da is connected to a common ground line. That is, the quench resistor Rq and the avalanche photodiode Da are connected in series to each other between the power source Vcc and the common signal ground. That is, the avalanche photodiode Da serves as a corresponding part of the light detection region of the light receiving array 40.

The AND circuit SW has first and second input terminals and an output terminal. The connection point between the quench resistor Rq and the avalanche photodiode Da is connected to an input terminal of the inverter INV, and an output terminal of the inverter INV is connected to the first input terminal of the AND circuit SW, and the second input terminal of the AND circuit SW is connected to the controller 80.

Light not being incident to each light receiving element 50 enables the avalanche photodiode Da to be maintained in a non-conductive state, so that the input terminal of the inverter INV is pulled up by the quench resistor Rq at a high level, i.e. a high voltage level, H. The inverter INV inverts the level of the input terminal thereof, so that the output of the inverter INV is maintained at a low level, i.e. a zero level, L.

External light incident to each light receiving element 50 causes a photon, i.e. a light element or light particle, of the incident external light to be incident to the avalanche photodiode Da, so that the avalanche photodiode Da is changed from the non-conductive state to a conductive state. This results in a large current based on the intensity of the incident light flowing through the quench resistor Rq. That is, each light receiving element 50 is driven in the Geiger mode.

This causes the input terminal of the inverter INV to be pulled down at the low level L. The inverter INV inverts the low level L of the input terminal thereof, so that the output of the inverter INV is inverted to the high level H that is based on the intensity, i.e. the luminous level, of the incident light.

That is, the inverter INV is configured to output a digital signal having one of the high level H and the low level L.

Because the output terminal of the inverter INV is connected to the first input terminal of the AND circuit SW, the digital signal output from the inverter INV is output from the AND circuit SW while being unchanged as long as a high level selection signal SC is input from the controller 80 to the second input terminal of the AND circuit SW. That is, the controller 80 controls the level of the selection signal SC to the high level H, which enables the digital signal output from the inverter INV to be output as an output signal Sout from the light receiving element 50, and to the low level L, which enables the output signal Sout from the light receiving element 50 to be maintained at the low level L independently of the digital signal input to the AND circuit SW.

The selection signal SC to the AND circuit SW of a light receiving element 50 being set to the high level H will be referred to as the AND circuit SW being in a selected state, and the selection signal SC to the AND circuit SW of a light receiving element 50 being set to the low level L will be referred to as the AND circuit SW being in a unselected state.

That is, the controller 80 selectively outputs the selection signal SC with the high level H to at least one of the light receiving elements 50, thus reading out the digital signal from the selected at least one of the light receiving elements 50. The selection signal SC will also be referred to as an address signal SC. Note that, if the avalanche photodiode Da is used in the linear mode, and the output of the avalanche photodiode Da is used as an analog signal, an analog switch can be used in place of the AND circuit SW.

After the large current has flowed through the quench resistor Rq, a voltage applied to the avalanche photodiode Da decreases, so that the avalanche diode Da returns back from the conductive state to the non-conductive state. This causes the input terminal of the inverter INV to be pulled up at the high level H. The inverter INV inverts the high level H of the input terminal thereof, so that the output of the inverter INV returns back to the low level L.

That is, each light receiving element 50 is configured such that the inverter INV outputs a pulse having the high level H for a very short period of time in response to a photon, i.e. light being incident to the corresponding light receiving element 50, i.e. the avalanche photodiode Da. From this viewpoint, the controller 80 outputs the selection signal SC with the high level H to each of the light receiving elements 50 in synchronization with the timing when the corresponding light receiving element 50 receives light. This enables the digital signal of the AND circuit SW, i.e. the output signal Sout, of each light receiving element 50 to reflect on the conductive or non-conductive state of the avalanche photodiode Da. In other words, each of the light receiving elements 50 outputs a pulse signal Sout each time a photon, i.e. light, is incident to the corresponding light receiving element 50 for a very short period of time; the level of the pulse signal Sout is based on the intensity of the incident light received by the corresponding light receiving element 50.

As schematically illustrated in FIG. 2, the light detection region of the light receiving array 40 is comprised of the light receiving elements 50, i.e. pixels, described above arranged in the horizontal and vertical directions of the measuring apparatus 20 as an array. The number of pixels of the light receiving elements 50 arranged in the horizontal direction will be referred to as H, and the number of pixels of the light receiving elements 50 arranged in the vertical direction will be referred to as V. That is, the light receiving array 40 is comprised of (H×V) pixels of the light receiving elements 50. The optical system 30 and the light receiving array 40 are designed and arranged such that the area constituted by the (H×V) pixels constituting the light detection region is larger than the size of the reflected-light image RS. This means that a degree of misalignment of the optical system 30 is kept within a predetermined designed margin, enabling the reflected-light image RS is within the light detection region of the light receiving array 40. A large degree of misalignment of the optical system 30 may result in the reflected-light image RS extending off the light detection region of the light receiving array 40.

As described above, each light receiving element 50 is configured to operate in the Geiger mode. This enables each light receiving element 50 to detect a single photon as reflected light when the single photon is only incident to the corresponding light receiving element 50. As described above, because the laser light SL is reflected diffusely by the outer surface of the target object OBJ, light returning back to the mirror 31 of the optical system 30 is limited to a part of reflected laser light based on the laser light SL. For this reason, even if the target object OBJ is located in the distance measurement space through which the laser light SL is scanned, the light receiving array 40 cannot necessarily detect reflected light using a laser pulse transmitted from the laser device 35 as the laser light SL. This means that each light receiving element 50 stochastically detects the reflected light RL.

That is, the SPAD calculator 100 of the first embodiment is configured to perform a statistical task based on the output signals Sout output from the light receiving elements 50, each of which is able to only detect stochastically the reflected light RL, thus detecting the reflected light RL.

As described above, the light receiving array 40 is comprised of (H×V) pixels of the light receiving elements 50 arranged in the respective horizontal and vertical directions, and the reflected-light image RS based on the reflected light RL is formed on the (H×V) pixels of the light receiving elements 50. The reflected-light image RS is based on reflected light obtained from a region scanned by the laser light SL. Because the mirror 31 is rotating about the rotation axis corresponding to the vertical direction, the reflected light RL continuously returns from a first end of the target object OBJ located in the scannable space in the horizontal direction to a second end of the target object OBJ.

In particular, a first time for which reflected light from a first scanned position of the target object OBJ has reached the light receiving array 40 is earlier than second time for which reflected light from a second scanned position of the target object OBJ has reached the light receiving array 40 as long as the first scanned position is closer than the second scanned position.

From this viewpoint, the first embodiment is configured to measure a distance of the target object OBJ based on variations of time for which the light receiving elements 50 each have detected a photon of reflected light from the target object OBJ.

The light receiving array 40 is comprised of a horizontal selector 51 and a vertical selector 52, and the controller 80 includes a CPU 81, a light receiving area selector 82, a storage device 83, a peripheral circuit 84, and a light receiving are detector 90. The storage device 83 includes, for example, a RAM, a ROM, and/or a semiconductor memory such as a flash memory. The CPU 81 is programmed to perform instructions of programs stored in the storage device 83, thus performing predetermined software tasks and the following routines described later. The peripheral circuit 84 includes, for example, a real-time clock.

The horizontal selector 51 is capable of selecting at least one of the H pixels in the (H×V) pixels of the light detection region, and the vertical selector 52 is capable of selecting at least one of the V pixels in the (H×V) pixels of the light detection region.

The light detection region selector 82 is controllably connected to each of the horizontal and vertical selectors 51 and 52. That is, the light detection region selector 82 is configured to cause the horizontal and vertical selectors 51 and 52 to freely select a limited area within the (H×V) pixels of the light detection region, and to read out the pulse signals Sout of respective limited light receiving elements 50 corresponding to the limited area.

Specifically, the horizontal and vertical selectors 51 and 52 are configured to output the selection signal SC with the high level H to the AND circuit SW of any one of the light receiving elements 50 when both the horizontal and vertical selectors 51 and 52 select the corresponding one of the light receiving elements 50.

That is, the horizontal and vertical selectors 51 and 52 are configured to (1) Set each of light receiving elements 50 within a specified readout area, which is narrower than the light detection region, to be in the selected state (2) Set each of light receiving elements 50 outside the specified readout area to be in the unselected state This setting enables an image on the specified readout area to be selectively read out.

That is, reflected light to be detected by the light receiving array 40 is not incident to the light detection region defined by all the (H×V) pixels of the light receiving elements 50, but is incident to a specified area within the light detection region; the specified area is defined based on the configuration and settings of the optical system 30. This specified area will be referred to as an active region comprised of (P×Q) pixels of the light receiving elements 50; P represents the number of pixels of the active region, which is smaller than the H pixels, in the horizontal direction, and Q represents the number of pixels of the active region, which is smaller than the V pixels, in the vertical direction (see FIG. 4).

The output signals Sout from the respective light receiving elements 50 are sent to the SPAD calculator 100.

Figure 4:
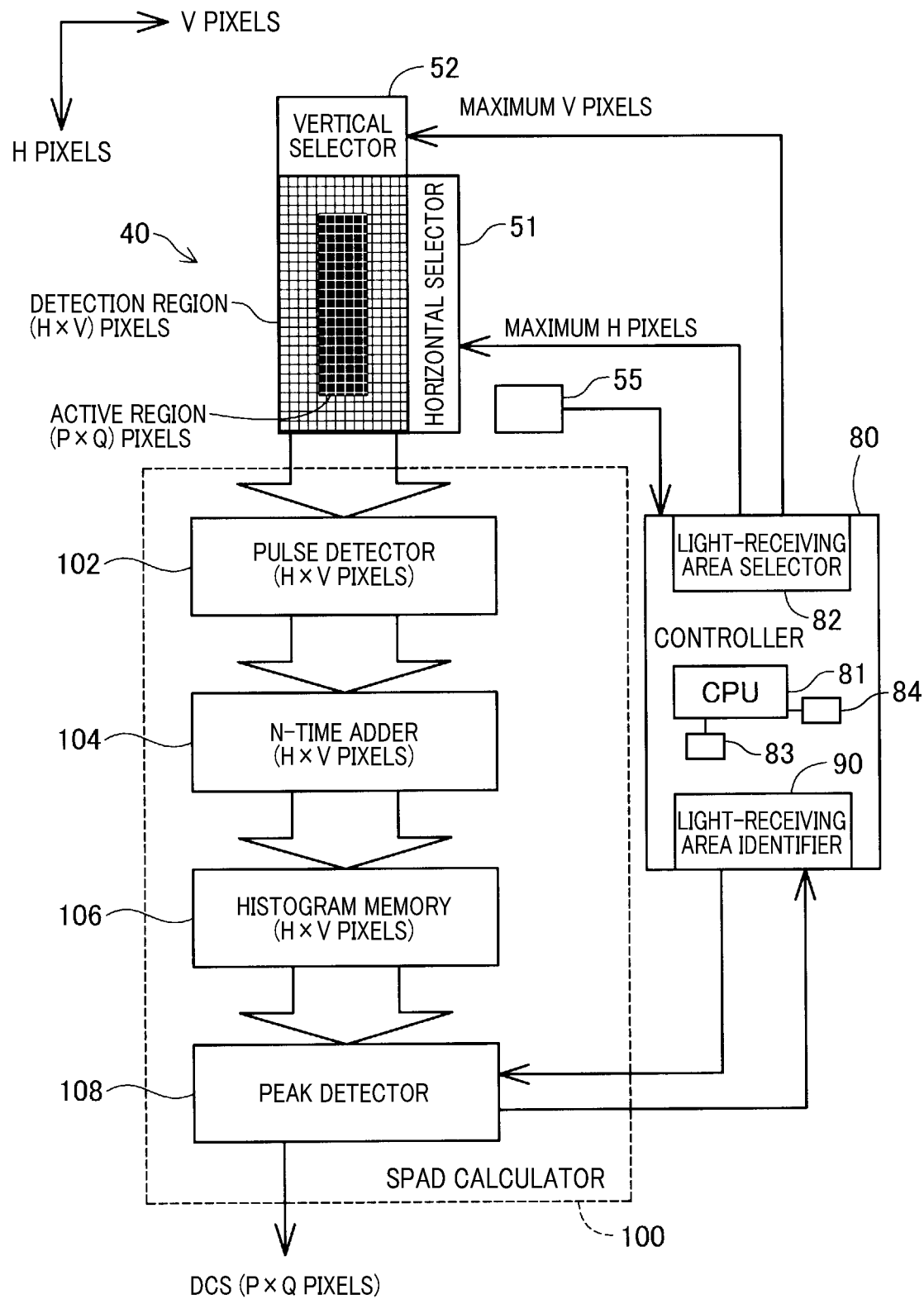
FIG. 4 is a block diagram schematically illustrating a SPAD calculator and a controller illustrated in FIG. 2.

Referring to FIG. 4, the SPAD calculator 100 is comprised of a pulse detector 102, an N-time adder or accumulator 104, a histogram memory 106, and a peak detector 108.

The pulse detector 102 receives the pulse signals Sout output from the respective (H×V) pixels of the light receiving elements 50.

The N-time adder 104 adds the high levels of respective N-time pulses received by each of the (H×V) pixels of the light receiving elements 50 (N is an integer equal to or more than 2).

The histogram memory 106 stores the added result for each of the (H×V) pixels as a histogram in the histogram memory 106

The peak detector 108 detects, based on the histogram stored in the histogram memory 106 for each of the (H×V) pixels, a peak intensity, i.e. a largest value, of the added results for the corresponding one of the (H×V) pixels.

Figure 5:
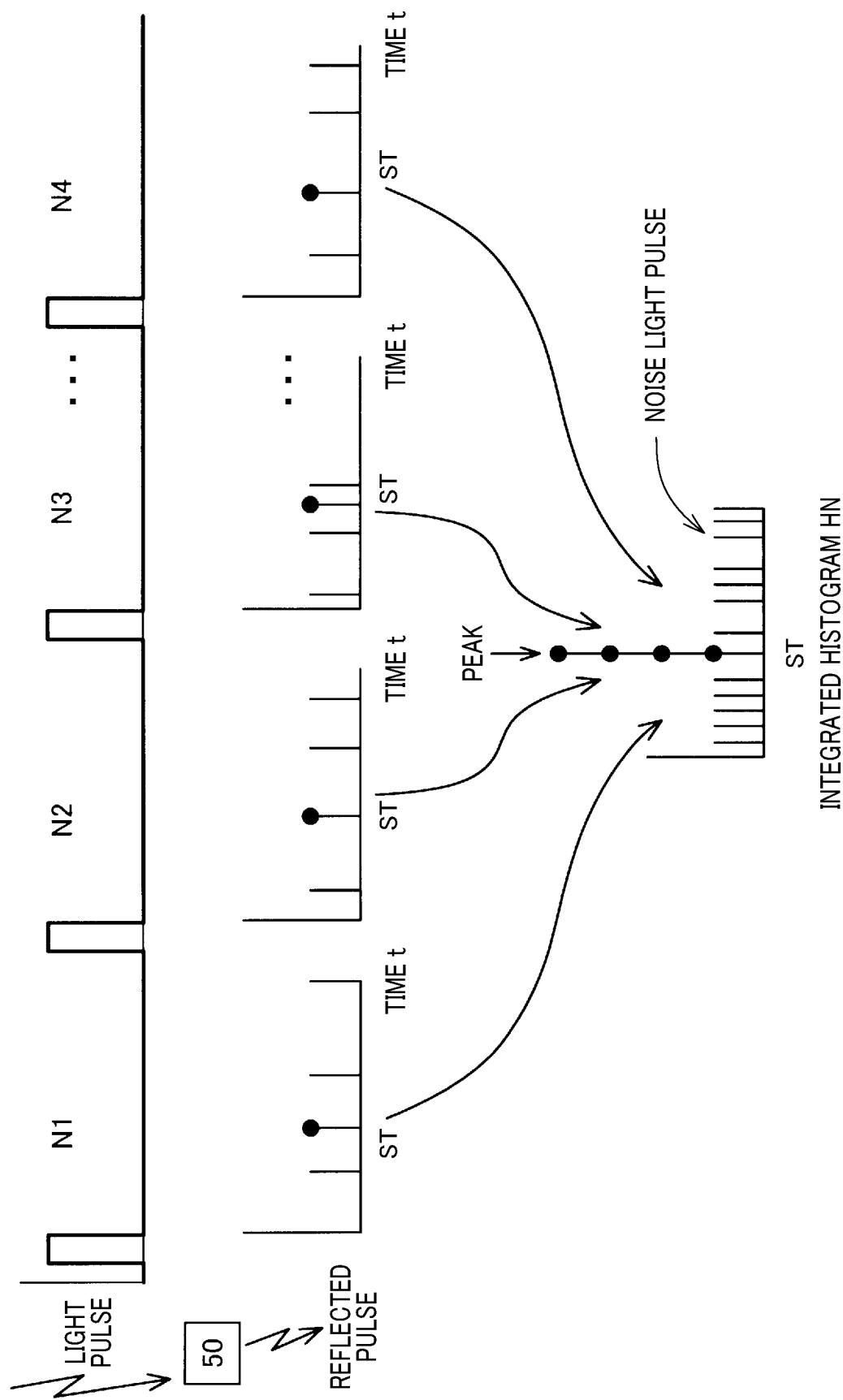
FIG. 5 is a timing chart schematically illustrating an example of how the first embodiment detects a peak intensity.

FIG. 5 schematically illustrates an example of how the components 102, 104, 106, and 108 of the SPAD calculator 100 operates.

The laser device 35 emits a laser pulse, so that the laser pulse is propagated to the target object OBJ via the optical system 30, so that a reflected light pulse based on reflection of the lase pulse by a specified portion of the target object OBJ is incident to, for example, the light receiving elements 50.

At least one of the light receiving elements 50, which will be referred to as a target light receiving element, detects a reflected light pulse as the reflected light at a specific point of time ST (see black circle) in FIG. 5 during a predetermined measurement period t that is needed for a reflected light pulse to have returned from the farthest point of the target object OBJ to the measuring apparatus 20.

That is, during the measurement period t, the target light receiving element 50 also detects ambient-light noise pulses in addition to the reflected light pulse. Because the target light receiving element 50 is configured to output the pulse signal Sout each time a photon of at least one of the reflected light pulse and the ambient-light noise pulse is incident thereto, the pulse detector 102 detects the pulse signals Sout for the target light receiving element 50.

The sequential measurement operation from emission of the laser pulse from the laser device 35 to detection of the light pulses by the target light receiving element 50 is repeated N times (see K1, K2, K3, . . . , KN in FIG. 5), so that the pulse signals Sout detected by the target light receiving element 50 for each of the N-time sequential measurement operations are input to the N-time adder 104.

The N-time adder 104 statistically superimposes the detected pulse signals Sout by all the N-time sequential measurement operations with each other to thereby obtain a histogram of the detected pulse signals Sout by all the N-time sequential measurement operations.

That is, the N-time adder 104 calculates, for the target light receiving element 50, the sum of (1) The intensities of the light pulse signals Sout obtained by the first sequential measurement operation K1

(2) The intensities of the light pulse signals Sout obtained by the second sequential measurement operation K2, . . . , and (3) The intensities of the light pulse signals Sout obtained by the N-th sequential measurement operation KN This obtains an integrated histogram HN (see FIG. 5). Then, the N-time adder 104 stores the integrated histogram HN in the histogram memory 106.

Specifically, for each of the N-time sequential measurement operations, the reflected light pulse based on reflection of the lase pulse by the same specified portion of the target object OBJ is detected at the same point of time during the measurement period t. In contrast, the ambient-light noise pulses are randomly generated during the N-time sequential measurement operations.

This therefore results in, in the integrated histogram HN, the sum of the intensities of the reflected light pulses obtained by the respective N-time sequential measurement operations showing the highest peak intensity as compared with the other intensities of the ambient-light noise pulses (see FIG. 5). This therefore enables the direction in which the reflected light pulses showing the highest peak intensity are returned to be determined as a peak direction.

The above feature for the target light receiving element 50 can also be obtained for each of the other light receiving elements 50 in addition to the target light receiving element 50.

Thus, the peak detector 108 is configured to read out the integrated histogram for each of the (H×V) pixels of the light receiving elements 50 stored in the histogram memory 106, and detect, for each of the (H×V) pixels of the light receiving elements 50, the peak intensity. In addition, the peak detector 108 calculates, based on the specific point ST of time of the peak intensity, time of flight, i.e. round-trip time, during which the laser pulse transmitted from the laser device 35 is propagated to the target object OBJ and, after being reflected by the target object OBJ, back to each of the light receiving elements 50 in the peak direction.

In particular, the peak detector 108 is configured to measure, based on the time of flight for each of the (P×Q) pixels of the light receiving elements 50, a distance of a corresponding portion of the target object OBJ relative to the corresponding one of the (P×Q) pixels of the light receiving elements 50.

This therefore results in the signal levels of the respective (P×Q) pixels of the light receiving elements 50 constituting a distance image of the target object OBJ.

Then, the peak detector 108 is configured to output, for each of the (P×Q) pixels of the light receiving elements 50, a distance signal DCS indicative of the measured distance of the corresponding portion of the target object OBJ relative to the corresponding one of the (P×Q) pixels of the light receiving elements 50.

As described above, the SPAD calculator 100 serves as a measurement unit that measures a distance of a target object for each of the (P×Q) pixels of the light receiving elements 50 based on the pulse signals Sout output from the corresponding one of the (P×Q) pixels of the light receiving elements 50.

Additionally, the peak detector 108 is configured to output, for each of the (H×V) pixels of the light receiving elements 50, a light-receiving area specifying signal indicative of the peak intensity of the corresponding pixel in addiction to the distance signals DCS.

That is, each of the distance signals DCS represents a detection signal of each of the respective (P×Q) pixels of the light receiving elements 50, which constitute the active region, and represents the measured distance of the corresponding portion of the target object OBJ relative to the corresponding one of the (P×Q) pixels of the light receiving elements 50.

In contrast, the light-receiving area specifying signal represents a detection signal of each of the (H×V) pixels of the light receiving elements 50, and represents the peak intensity of the corresponding pixel. The light-receiving area specifying signals output from the peak detectors 108 of the respective (H×V) pixels of the light receiving elements 50 are output to the light-receiving area detector 90 of the controller 80.

The light-receiving area detector 90 is configured to identify, based on the light-receiving area specifying signals, the (P×Q) pixels of the light receiving elements 50 as the active region, i.e. the light receiving area. How the light-receiving area detector 90 identifies the active region comprised of the (P×Q) pixels of the light receiving elements 50 as the light receiving area will be described later.

That is, the peak detector 108 is configured to (1) Specify the active area comprised of the (P×Q) pixels of the light receiving elements 50 based on information indicative of the detected active area comprised of the (P×Q) pixels of the light receiving elements 50

(2) Measure, based on the time of flight for each of the (P×Q) pixels of the light receiving elements 50, the distance of the corresponding portion of the target object OBJ relative to the corresponding one of the (P×Q) pixels of the light receiving elements 50

The measuring apparatus 20 includes an ambient light sensor 55 for measuring the intensity of ambient light incident to the light receiving array 40 via the optical system 35, and outputting a measurement signal indicative of the intensity of the ambient light to the controller 80. This enables the controller 80 to obtain the intensity of the ambient light incident to each of the light receiving elements 50 of the light receiving array 40.

Figure 6:
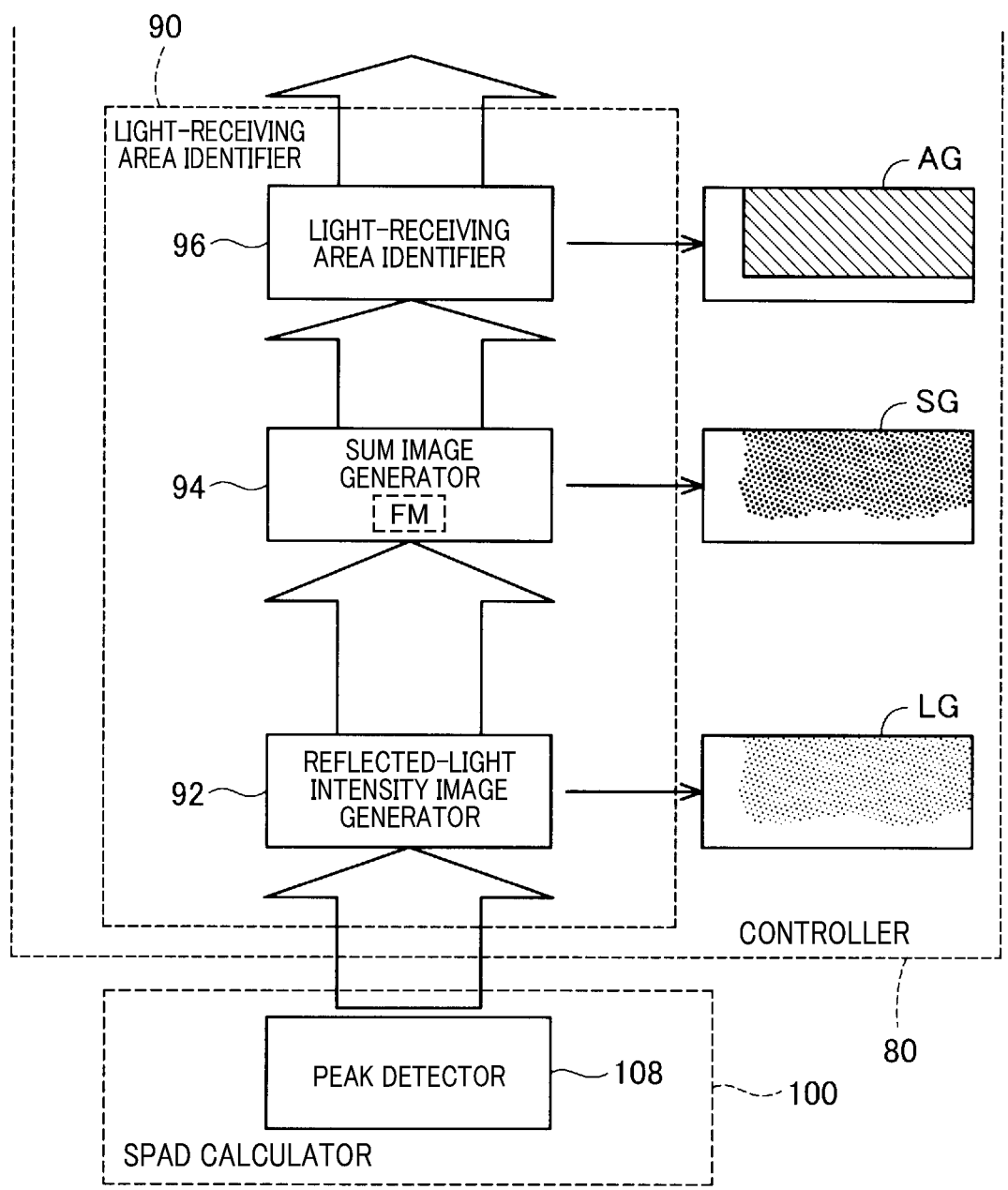
FIG. 6 is a block diagram schematically illustrating an example of the structure of a light receiving area identifier illustrated in FIG. 4.

Next, the following describes an example of the structure of the light-receiving area detector 90 with reference to FIG. 6.

Referring to FIG. 6, the light-receiving area detector 90 includes a reflected-light intensity image generator 92, a sum image generator 94, and a light-receiving area identifier 96.

The reflected-light intensity image generator 92 generates, based on the light-receiving area specifying signal for each of the (H×V) pixels of the light receiving elements 50 sent from the peak detector 108, a reflected-intensity image LG; each pixel of the reflected-intensity image LG corresponds to the peak intensity of the corresponding pixel of the (H×V) pixels of the light receiving elements 50.

As described above, the PAD calculator 100 carries out the N-time sequential measurement operations 100 to thereby cause the reflected-light intensity image generator 92 to generate the reflected-intensity image LG. The SPAD calculator 100 and the intensity image generator 92 according to the first embodiment sequentially generate the reflected-intensity images LG.

The sum image generator 94 is configured to add the sequentially generated reflected-intensity images LG to each other, thus generating a cumulative sum image SG. For example, the sum image generator 94 is comprised of a frame memory FM, which can store an image based on the (H×V) pixels of the light receiving elements 50, and the reflected-light intensity image generator 92 sequentially stores the reflected-intensity images LG in the frame memory FM plural times M, thus generating the cumulative sum image SG. The number of times M the reflected-intensity images LG are added will be referred to as the addition number of times M.

The light-receiving area identifier 96 detects, from the cumulative sum image SG, a high-cumulative region AG to thereby identify the detected high-cumulative region AG as the light receiving area.

Specifically, because the intensities of the pixels corresponding to the high-cumulative region AG are higher than those of the other pixels that do not correspond to the high-cumulative region AG, the light-receiving area identifier 96 analyzes the cumulative sum image SG to thereby determine the shape of the reflected-light image RS formed on the light detection region of the light receiving array 40.

Because the reflected-light image RS usually has a quadrate shape, the light-receiving area identifier 96 approximates the shape of the cumulative sum image SG by a minimum quadrate-shaped area that can enclose the cumulative sum image SG, thus identifying the minimum quadrate-shaped area as the light receiving area.

Alternatively, the light-receiving area identifier 96 can approximate the shape of the cumulative sum image SG by a minimum quadrate-shaped area such that the minimum quadrate area is circumscribed by the outline of the cumulative sum image SG.

The light-receiving area identifier 96 can approximate the shape of the cumulative sum image SG by a minimum rectangular-shaped area as an example of a minimum quadrate-shaped area, a minimum rectangular area.

That is, the light-receiving area identifier 96 preferably determines the shape of the light receiving area in accordance with the shape of the reflected-light image RS. For example, if the reflected-light image RS has a substantially elliptical shape, the light-receiving area identifier 96 can determine the shape of the light receiving area having a substantially elliptical shape.

Distance Image Forming Routine

Figure 7:
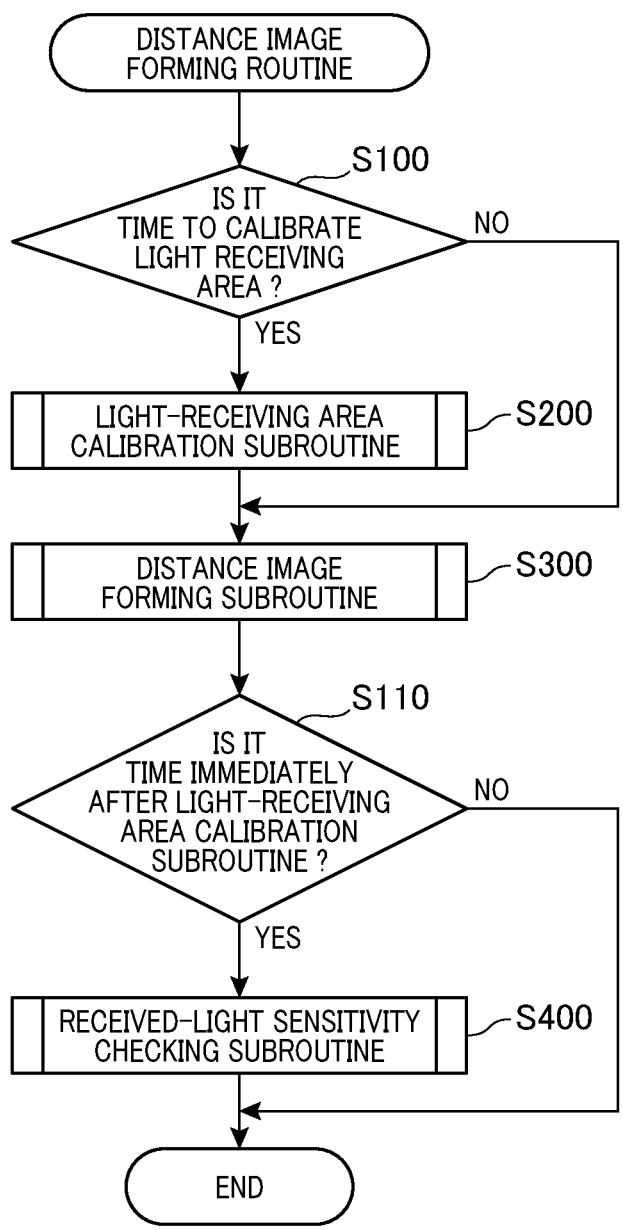
FIG. 7 is a flowchart schematically illustrating a distance image forming routine for a distance measuring task carried out by the optical distance measuring apparatus illustrated in FIG. 1.

The following describes a distance image forming routine for a distance measuring task carried out by the measuring apparatus 20 with reference to FIG. 7. Note that the distance measuring task is configured to (1) Transmit the laser light SL to the distance measurement space (2) Receive, by the light receiving array 40, reflected light RL based on reflection of a target object OBJ to thereby obtain a reflected-light image RL on the light receiving area, i.e. the (P×Q) pixels of the light receiving elements 50 o the light receiving array 40

(3) Measure, based on time of flight for each of the (P×Q) pixels of the light receiving elements 50, a distance of a corresponding portion of the target object OBJ relative to the corresponding one of the (P×Q) pixels of the light receiving elements 50

When the measuring apparatus 20 is started, the measuring apparatus 20 repeatedly executes the distance image forming routine after completing a predetermined initializing process.

When starting the distance image forming routine, the controller 80, i.e. its CPU 81, of the measuring apparatus 20 determines whether it is time to calibrate the light receiving area of the measuring apparatus 20 in step S100. Calibration of the light receiving area, which is used to measure a distance of the target object OBJ, of the measuring apparatus 20 means detection of misalignment of the image RS formed on the light receiving array 40 due to misalignment of the optical system 30, and correction of the light receiving area.

The controller 80 of the measuring apparatus 20 is programmed to determine that it is time to calibrate the light receiving area for example at any one of the following timings:

(1) The first timing when the measuring apparatus 20 is started (2) The second timing that cyclically occurs while the measuring apparatus 20 is performing the distance measuring task.

(3) The third timing when the measuring apparatus 20 is terminated (4) The fourth timing being any timing while the measuring apparatus 20 is not executing the distance measurement task, for example, when the vehicle is stopped (5) The fifth timing indicative of each time the measuring apparatus 20 starts the distance measurement task (6) The sixth timing indicative of a temporarily allowable timing, such as cycle stealing timing, during execution of the distance measurement task (7) The seventh timing when calibration of the light receiving area is instructed by a user (8) The eighth timing when the controller 80 determines that a target object OBJ is located within a predetermined distance range from the measuring apparatus 20

(9) The ninth timing when an external calibration instruction is input to the measuring apparatus 20 at factory adjustment or periodic inspection of the measuring apparatus 20

As an example of the seventh timing, if the measuring apparatus 20 is installed in a vehicle, and an on-off calibration switch, which is connected to the controller 80, is provided to, for example, an instrumental panel close to the driver's seat, the seventh timing is timing when the driver turns on the on-off calibration switch.

Upon determining that it is time to calibrate the light receiving area of the measuring apparatus 20 (YES in step S100), the controller 80 performs a light-receiving area calibration subroutine in step S200. After completing the light-receiving area calibration subroutine, the controller 80 performs a distance image forming subroutine in step S300.

Otherwise, upon determining that it is not time to calibrate the light receiving area of the measuring apparatus 20 (NO in step S100), the controller 80 controls the optical system 30, the light receiving array 40, and the SPAD calculator 100 to thereby perform the distance image forming subroutine in step S300 while skipping the light-receiving area calibration subroutine in step S200.

The light-receiving area calibration subroutine will be described later with reference to FIG. 8.

The distance image forming subroutine in step S300 is configured to form the distance image using the calibrated light receiving area, and output the distance image as the distance signals DCS. That is, the distance image has a size matching with a scanned region of the mirror 31, and includes pixels of the calibrated light receiving area; each of the pixels of the distance image is a parameter indicative of the distance of a corresponding portion of a target object OBJ located in the scanned region relative to the measuring apparatus 20.

As described above, the distance defined by each pixel of the distance image is defined as time of flight, i.e. round-trip time, during which the laser pulse transmitted from the laser device 35 is propagated to the target object OBJ and an extracted light pulse based on the laser pulse returns back to the corresponding pixel from a determined peak direction corresponding to a predetermined value of the rotation angle of the mirror 31.

Specifically, the N-time sequential measurement operations each including emission of the laser pulse from the laser device 35 in a predetermined direction and detection of returning light pulses by the target light receiving element 50 are carried out. Then, the returning light pulses obtained by all the N-time sequential measurement operations are superimposed with each other to thereby detect the highest peak for each pixel of the calibrated light receiving area. This therefore enables, for each pixel of the calibrated right receiving area, the direction in which the reflected light pulses showing the highest peak intensity returning to the corresponding pixel to be determined as the peak direction (see FIG. 5).

That is, the distance image comprises the pixels each having the corresponding peak intensity, i.e. peak level. The distance signals DCS representing the respective peak intensities of all the pixels of the distance image are output from the peak detector 108 to an external device 200 (see FIG. 2).

For example, a cruise-assist device can be used as the external device 200 if the measuring apparatus 20 is installed in a vehicle. The cruise-assist device 200 recognizes the existence of the target object OBJ in accordance with the distance image, i.e. the detection signals DCS, and controls, for example, an information providing unit, a brake system, and/or a steering system installed in the vehicle, to thereby avoid collision between the recognized target object OBJ and the vehicle and/or mitigate damage due to collision therebetween. The external device 200 can be capable of displaying the distance image on a display. If the measuring apparatus 20 is installed in a vehicle, the external device 200 is capable of superimposing the distance image on an image around the vehicle captured by a camera installed in the vehicle. This enables pedestrians in the superimposed image to be marked.

As another example, a server can be used as the external device 200. That is, the distance signals DCS representing the respective peak intensities of all the pixels of the distance image are output from the peak detector 108 to the server 200 via radio waves. The server is capable of collecting the distance images from the measuring apparatuses 20 installed in vehicles travelling within a predetermined region, and using the collected distance images as big data representing the conditions of roads, which include traffic jams in roads included in the predetermined region.

If the measuring apparatus 20 is mounted to a predetermined portion, which enables the measuring apparatus 20 to measure a distance of a road surface, on which the vehicle is travelling, from the apparatus 20, of a vehicle, the measuring apparatus 20 is capable of periodically measuring the distance of the road surface, and of recognizing the three-dimensional shape of the road surface.

After completing the distance image forming subroutine in step S300, the controller 80 determines whether the controller 80 has carried out the distance image forming subroutine immediately after the light-receiving area calibration subroutine in step S200 in step S110. Upon determining that the controller 80 has carried out the distance image forming subroutine immediately after the light-receiving area calibration subroutine in step S200 (YES in step S110), the controller 80 performs a received-light sensitivity checking subroutine in step S400.

The received-light sensitivity checking subroutine is programmed to check whether the total received-light sensitivity of the light receiving array 40 after calibration of the light receiving area is higher, so that formation of the distance image can be carried out under more favorable conditions. In other words, the received-light sensitivity checking subroutine is programmed to check whether the total received-light sensitivity of the light receiving array 40 after calibration of the light receiving area is kept unchanged.

That is, the received-light sensitivity checking subroutine is programmed to actually generate a new distance image using the calibrated light receiving area, and determine whether the total received-light sensitivity of the light receiving array 40 after calibration of the light receiving area is equal to or higher, so that formation of the distance image can be carried out under more favorable conditions in step S400.

Upon determining that the total received-light sensitivity of the light receiving array 40 after calibration of the light receiving area is lower, so that formation of the distance image has been carried out under less favorable conditions, the controller 80 returns the calibrated light receiving area to the original pre-calibrated light receiving area, and terminates the received-light sensitivity checking subroutine.

Otherwise, upon determining that the total received-light sensitivity of the light receiving array 40 after calibration of the light receiving area is higher, so that formation of the distance image has been carried out under more favorable conditions), the controller 80 terminates the received-light sensitivity checking subroutine, and therefore terminates the distance image forming routine.

Otherwise, upon determining that the controller 80 has carried out the distance image forming subroutine not immediately after the light-receiving area calibration subroutine in step S200 (NO in step S110), the controller 80 terminates the received-light sensitivity checking subroutine while skipping the received-light sensitivity checking subroutine in step S400, and therefore terminates the distance image forming routine.

Light-Receiving Area Calibration Subroutine

Figure 8:
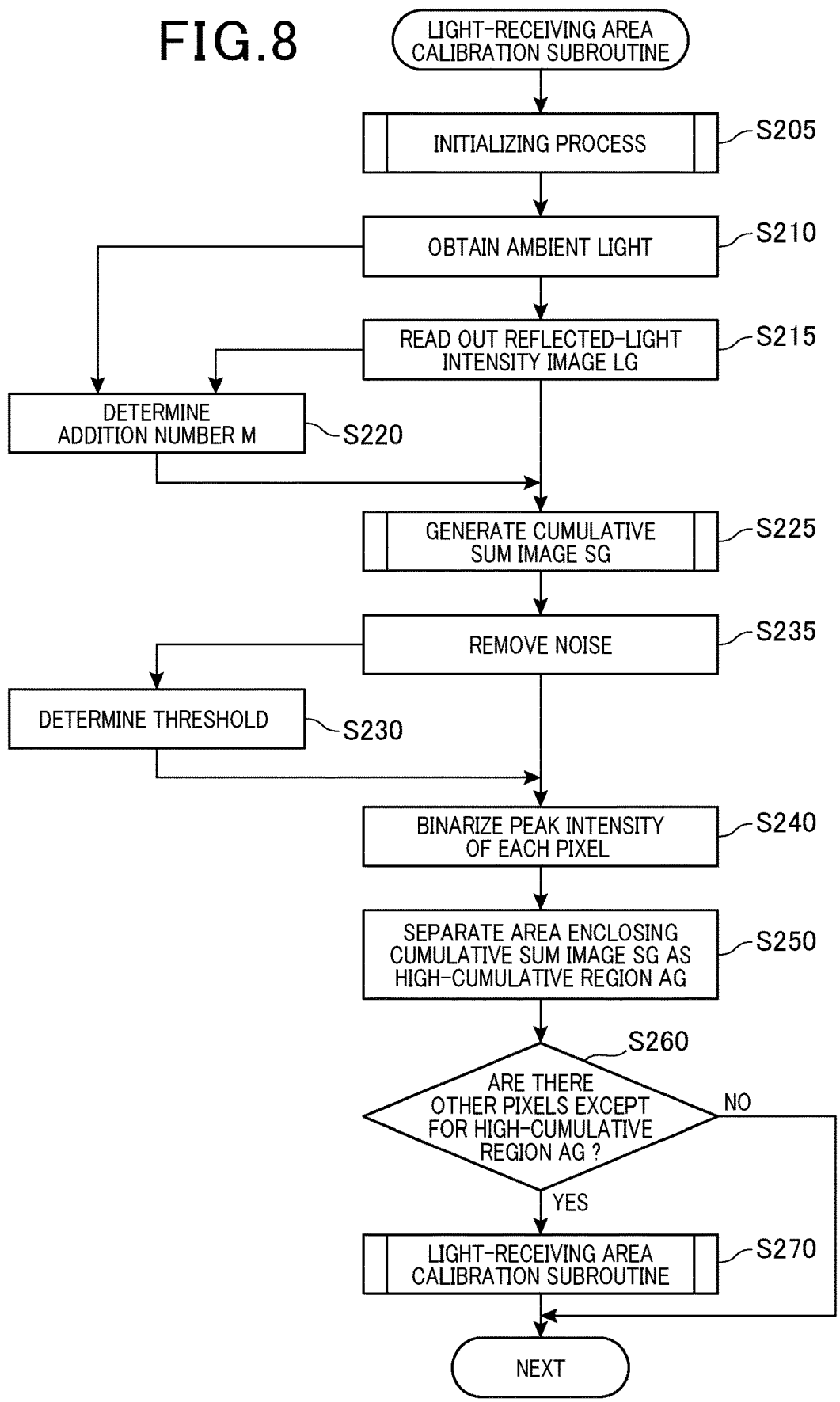
FIG. 8 is a flowchart schematically illustrating a light-receiving area calibration subroutine illustrated in FIG. 7.

The following describes the light-receiving area calibration subroutine with reference to FIG. 8.

When starting the light-receiving area calibration subroutine in step S200, the controller 80, i.e. its CPU 81, performs the initializing process in step S205. The initializing process includes a task of storing data indicative of the immediately previous light receiving area in the storage device 83, a task of clearing the frame memory FM of the sum image generator 94, and a task of causing the SPAD calculator 100 to reset data stored in the histogram memory 106.

Next, the CPU 81 obtains, based on the measurement signal output from the ambient light sensor 55, the intensity of the ambient light in step S210. Then, the CPU 81 accesses the reflected-light intensity image generator 92 of the light-receiving area detector 90 to thereby read out the reflected-intensity image LG in step S215.

Following the operation in step S215, the CPU 81 compares, for example, the maximum value or the average value of the intensities of all the pixels of the reflected-intensity image LG with the intensity of the ambient light in step S220. Then, the CPU 81 determines the addition number of times M the reflected-intensity images LG have been added in accordance with the compared results in step S220.

For example, if the intensity of the ambient light is greater than the maximum value or the average value of the intensities of all the pixels of the reflected-intensity image LG, the CPU 81 sets the additional number of times of M to be larger, because the ambient-light noise pulses received by the light receiving array 40 for each of the N-time sequential measurement operations becomes larger.

Otherwise, if the intensity of the ambient light is equal to or smaller than the maximum value or the average value of the intensities of all the pixels of the reflected-intensity image LG, the CPU 81 maintains the additional number of times of M unchanged or sets the additional number of times of M to be smaller.

The CPU 81 outputs the additional number of times M to the reflected-light intensity image generator 92 or the sum image generator 94, and causes the reflected-light intensity image generator 92 or the sum image generator 94 to add the sequentially generated reflected-intensity images LG in the frame memory FM the additional number of times M in step S225. This results in the cumulative sum image SG being formed in the frame memory FM in step S225.

That is, the operation in step S225 superimposes the reflected-intensity images LG, each pixel of which includes the corresponding peak intensity, sequentially generated by the peak detector 108 with each other. Note that, when the operation in step S225 can superimpose a reflected-intensity image LG currently sent from the peak detector 108 with the previously superimposed reflected-intensity images LG in the frame memory FM, the operation in step S225 can remove the ambient intensity from the intensity of each of the pixels of the reflected-intensity image LG currently sent from the peak detector 108.

Following the operation in step S225, the CPU 81 removes noise from the cumulative sum image SG in step S235. As illustrated in FIG. 5, the peak detector 108 generates the reflected-intensity image LG while removing, from each pixel of the reflected-intensity image LG, noise pulses respectively detected at the different timings. If however noise pulses are detected at a same timing due to, for example, particles in the air around the light receiving array 40, one or more noise-based peaks may remain in the cumulative sum image SG that has been generated based on the M-time additions of the reflected-intensity images LG.

For addressing the remaining noise pulses, the CPU 81 determines a threshold for eliminating the levels of the noise-based peaks from the cumulative sum image SG in the frame memory FM in step S230. That is, the threshold is set to be higher than the levels of the noise-based peaks and lower than the levels of the reflected-pulse based pixels.

Then, the CPU 81 binarizes the peak intensity of each of the pixels of the cumulative sum image SG in the frame memory FM such that one or more peak intensities of corresponding pixels higher than the threshold has a first digital value of, for example, 1 corresponding to black, and the other peak intensities of corresponding pixels equal to or lower than the threshold has a second digital value of, for example, 0 corresponding to white in step S240.

Following the operation in step S240, the CPU 81 separates, from the frame memory FM, a minimum rectangular-shaped area that encloses the cumulative sum image SG in accordance with information indicative of the light receiving area formed by the optical system 30 on the light receiving array 40 has a substantially rectangular shape (see FIG. 6) in step S250. The separated area will be referred to the high-cumulative region AG.

As described above, an image formed by the optical system 30 is designed to be normally within the light detection region comprised of the (H×V) pixels of the light receiving array 40. Then, the CPU 81 determines whether the light detection region comprised of the (H×V) pixels of the light receiving array 40 has other pixels except for the high-cumulative region AG in step S260.

Upon determining that the light detection region comprised of the (H×V) pixels of the light receiving array 40 has no other pixels except for the high-cumulative region AG, i.e. the high-cumulative region AG extends to the light detection region comprised of the (H×V) pixel of the light receiving array 40 ((NO in step S260), the CPU 81 determines that there is a problem in detection of the reflected-intensity images LG due to any cause. Then, the CPU 81 terminates the light-receiving area calibration subroutine without performing calibration of the light receiving area. Possible causes for such a problem for example include (1) A situation where misalignment of the lens 36 results in the image RS blurring so that the reflected light pulse is incident to the whole area of the light receiving array 40

(2) A situation where light, such as sunlight, reflected by the bodies of one or more other vehicles is directly incident to the light detection region of the light receiving array 40

Otherwise, upon determining that the high-cumulative region AG is limited to a part of the light detection region of the light receiving array 40 so that the light detection region has other pixels except for the high-cumulative region AG (YES in step S260), the CPU 81 performs a light-receiving area calibration task in step S270, and thereafter terminates the light-receiving area calibration subroutine.

Note that calibration of the light receiving area means to identify, on the light receiving array 40, a region on which an image by the optical system 30 is formed as a calibrated light receiving area, i.e. a calibrated active region. In other words, calibration of the light receiving area means to update an immediately previous light receiving area to a new light receiving area as a calibrated light receiving area.

In particular, calibration of the light receiving area according to the first embodiment is configured to perform at least one of the following first and second methods:

(1) The first method causes the horizontal selector 51 and the vertical selector 52 to set the AND circuits SW of light receiving elements 50 constituting the identified light receiving area to be in the selected state while setting the other AND circuits SW of light receiving elements 50 except for the identified light receiving area to be in the non-selected state (2) The second method limits a pixel processing range of at least one of the pulse detector 102, the N-time adder 104, the histogram memory 106, and the peak detector 108 from the (H×V) pixels of the light receiving elements 50 to smaller pixels constituting the identified light receiving area The first method enables the readout range of the pulse signals Sout from the light receiving array 40 to be limited, resulting in shorter readout time of the pulse signals Sout from the light receiving array 40.

The second method enables the processing amount or load of at least one of the pulse detector 102, the N-time adder 104, the histogram memory 106, and the peak detector 108, such as the superimposing process by the N-time adder 104, to be lowered, resulting in shorter readout time of the pulse signals Sout from the light receiving array 40.

As described above, the optical system 30 is designed as the coaxial optical system, so that an image formed by reflected light generated based on reflection of laser light is substantially located to a predetermined location on the light receiving array 40. Using this feature enables the cumulative sum image SG to be easily generated from the reflected-intensity images LG.

Figure 9A:
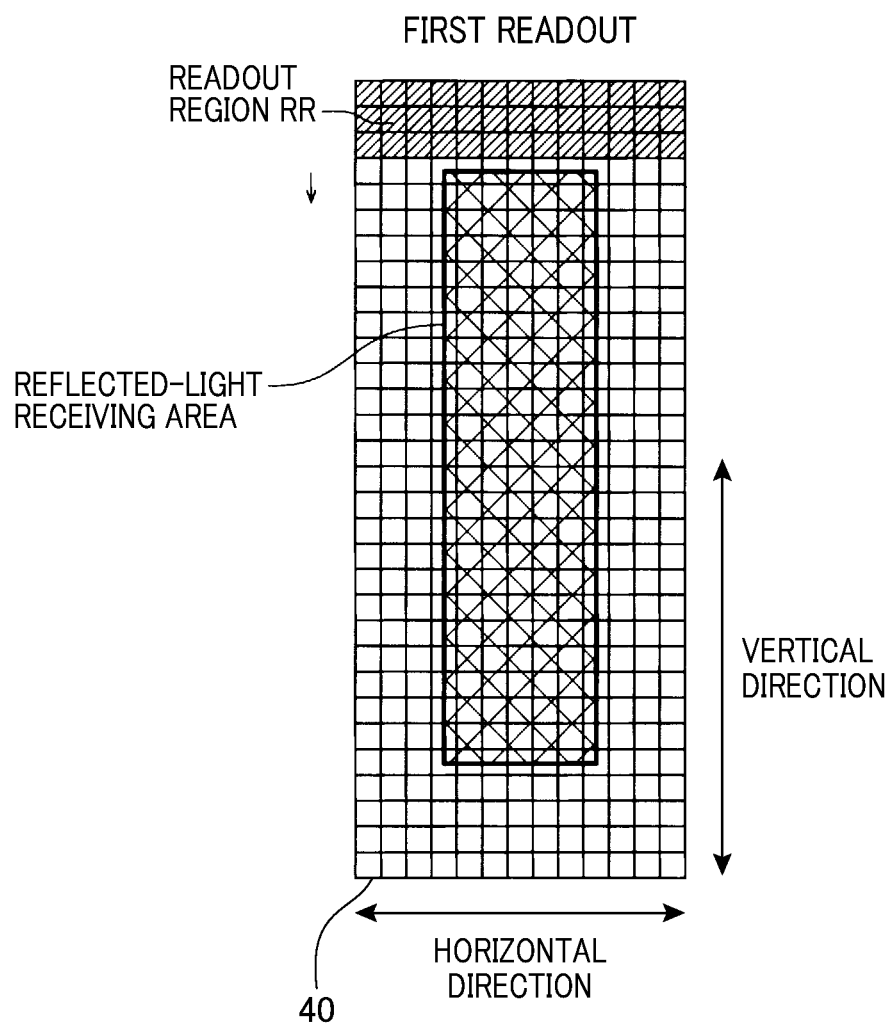
FIG. 9A is a diagram schematically illustrating that a horizontal selector selects a readout region, and readout of pulse signals from the readout region is carried out at the first time according to the first embodiment.

The following describes how the cumulative sum image SG is generated based on the reflected-intensity images LG with reference to FIGS. 9A to 11. FIG. 9A shows an area in which reflected light is received using cross hatching.

As described above, the controller 80 control the horizontal selector 51 and/or the vertical selector 52 to thereby easily change a readout region of the pulse signals Sout from the light receiving array 40.

Based on this feature, the controller 80 controls the horizontal selector 51 to shift a readout region RR, comprised of, for example, three horizontal pixel-rows, in the vertical direction each time the sequential measurement operation from emission of the laser pulse from the laser device 35 to detection of the light pulses by the target light receiving element 50 is carried out from the first time to the N-th time (see FIGS. 9A to 9D). This enables the reflected-light intensity image generator 92 to generate the N reflected-intensity images LG.

FIG. 9A is a diagram schematically illustrating that a horizontal selector 51 selects the readout region RR comprised of three horizontal pixel-rows at the upper end of the light receiving array 40, and readout of the pulse signals Sout from the readout region RR is carried out at the first time, and FIG. 9B illustrates that the horizontal selector 51 shifts the readout region RR by one pixel-row in the vertical direction toward the lower end, and readout of the pulse signals Sout from the readout region RR is carried out at the second time.

FIG. 9C illustrates that the horizontal selector 51 further shifts the readout region RR by one pixel-row in the vertical direction toward the lower, and readout of the pulse signals Sout from the readout region RR is carried out at the third time.

Thereafter, the horizontal selector 51 sequentially shifts the readout region RR by one pixel-row in the vertical direction toward the lower end each time the sequential measurement operation is carried out from the fourth time to the N-th time.

That is, FIG. 9D illustrates that the horizontal selector 51 selects the readout region RR at the lower end of the light receiving array 40, and readout of the pulse signals Sout from the readout region RR is carried out at the N-th time.

These sequential readout operations enable, from pixels included in the light receiving area comprised of three horizontal pixel-rows, peak intensities to be read out, resulting in the reflected-intensity image LG included in the readout region RR being read out.

Figure 10:
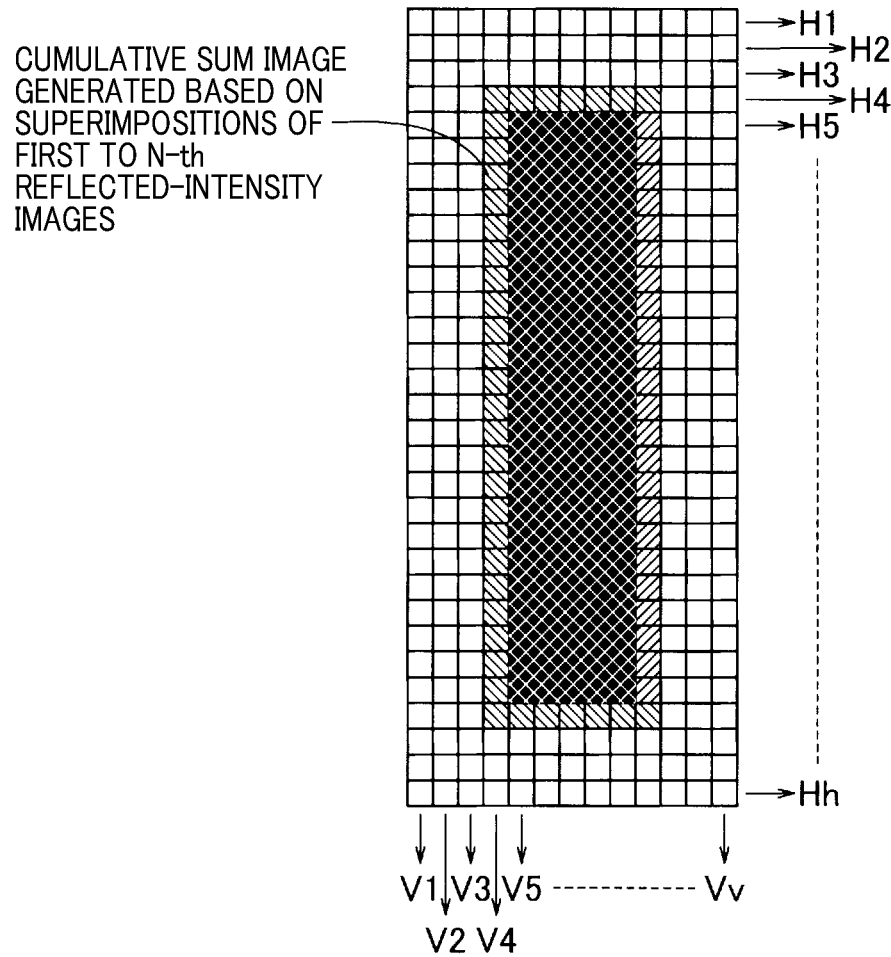
FIG. 10 is a diagram schematically illustrating a cumulative sum image generated based on superimpositions of N reflected-intensity images according to the first embodiment.

This readout operation from the readout region RR N times while shifting the readout region RR comprised of three horizontal pixel-rows by one pixel-row enables, within the light receiving area, a histogram including three peaks to be obtained for each readout operation. In addition, this readout operation from the readout region RR N times while shifting the readout region RR comprised of horizontal three pixel-rows by one pixel-row enables, outside the light receiving area, a histogram including zero peaks to be obtained for each readout operation. At each pixel of the edge of the light receiving area, a peak intensity level may be detected or not for each of the sequential readout operations. The ratio of a peak detected at each pixel of the edge of the light receiving area to a peak intensity level undetected at the corresponding pixel of the edge portions of the light receiving area may be statistically determined. As illustrated in FIG. 10, the cumulative sum image SG generated based on superimpositions of the N reflected-intensity images LG by the sum image generator 94 is configured such that each pixel of the edge of the cumulative sum image SG has a peak intensity smaller than a peak intensity of each pixel of the inner region of the cumulative sum image SG surrounded by the edge thereof.

Figure 11:
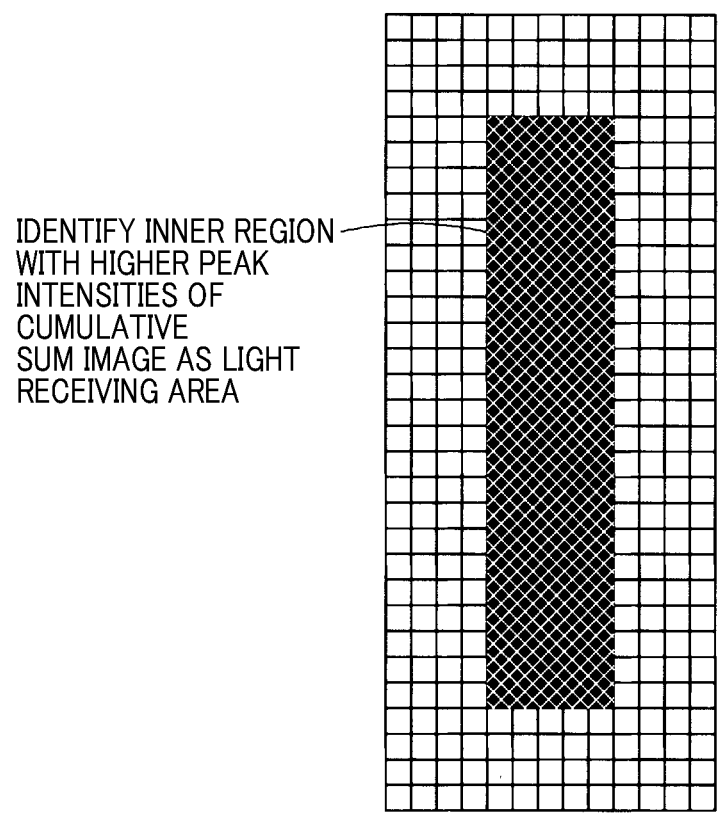
FIG. 11 is a diagram schematically illustrating how a light-receiving area identifier identifies a light receiving area according to the first embodiment.

For this reason, as illustrated in FIG. 11, the light-receiving area identifier 96 identifies the inner region, which has higher peak intensities, of the cumulative sum image SG surrounded by the edge as the light receiving area, i.e. the active region.

Note that the controller 80 causes the horizontal selector 51 to use the readout region RR comprised of three horizontal pixel-rows, but can cause the horizontal selector 51 to use the readout region RR comprised of four or more horizontal pixel-rows, for example, horizontal ten pixel-rows. In addition, the horizontal selector 51 can shift the readout region RR by two or more pixel-rows in the vertical direction as long as the shifted number of pixel-rows in the vertical direction is smaller than the readout number of pixels of each horizontal pixel-row.

As described above, the measuring apparatus 20 is configured to accurately identify, on the light detection region, i.e. the light sensitive surface, of the light receiving array 40, the light receiving area in which the image RS based on the reflected light RS is actually formed. Then, the measuring apparatus 20 detects peak intensities of the reflected light RS in the identified light receiving area to thereby obtain the distance signals DCS, thus externally outputting the distance signals DCS. This configuration enables a distance of a target object OBJ to be measured with higher accuracy. That is, even if the location of the image RS based on reflected light formed on the light detection region of the light receiving elements 50 is misaligned, the light-receiving area calibrating routine (see step S200 of FIG. 7 and steps S205 to S270 of FIG. 8) enables the light receiving area of the light detection region, in which the image of the reflected light is actually formed, to be easily identified. The identified light receiving area enables peaks intensities of pixels to be easily detected, thus preventing reduction in accuracy of measuring a distance of a target object OBJ.

The first embodiment changes the number of times M in accordance with the intensity of the ambient light, but the present disclosure is not limited thereto. Specifically, the CPU 81 can reduce, from each of the sequentially generated reflected-intensity images LG, a value based on the intensity of the ambient light while the number of times M is maintained at a constant value or changes depending on the intensity of the ambient light.

In addition, as illustrated in FIG. 10, a peak intensity of each pixel of the cumulative sum image SG is stored in the corresponding pixel of the frame memory FM, but the present disclosure is not limited thereto. Specifically, the sum of peak intensities of each horizontal row and the sum of peak intensities of each vertical column can be stored in the frame memory FM. For example, as illustrated in FIG. 10, the sum of peak intensities of the first horizontal row H1, the sum of peak intensities of the second horizontal row H2, . . . , and the sum of peak intensities of the h-th horizontal row Hh are stored in the frame memory FM for each of the N-time sequential measurement operations. Similarly, the sum of peak intensities of the first vertical column V1, the sum of peak intensities of the second vertical column V2, . . . , and the sum of peak intensities of the v-th vertical row Vv are stored in the frame memory FM for each of the N-time sequential measurement operations.

This configuration makes it possible to identify the inner region, which has higher peak intensities, of the cumulative sum image SG surrounded by the edge as the light receiving area. This configuration eliminates the need of storing a peak intensity of each pixel of the cumulative sum image SG in the corresponding pixel of the frame memory FM, resulting in reduction of the capacity of the frame memory FM of the sum image generator 94.

Figure 12:
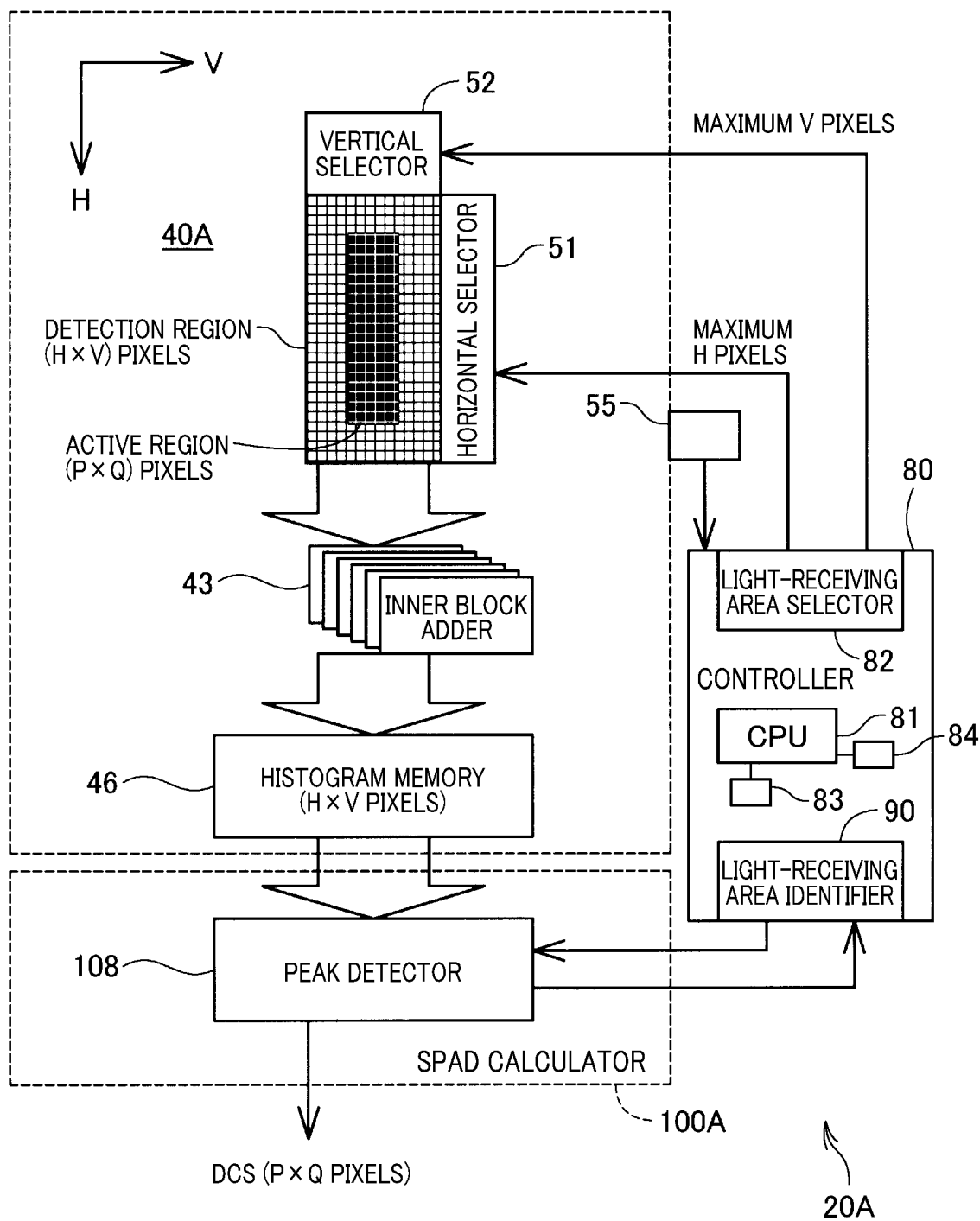
FIG. 12 is a perspective view schematically illustrating an example of the configuration of an optical system of an optical distance measuring apparatus according to the second embodiment of the present disclosure.
Figure 13:
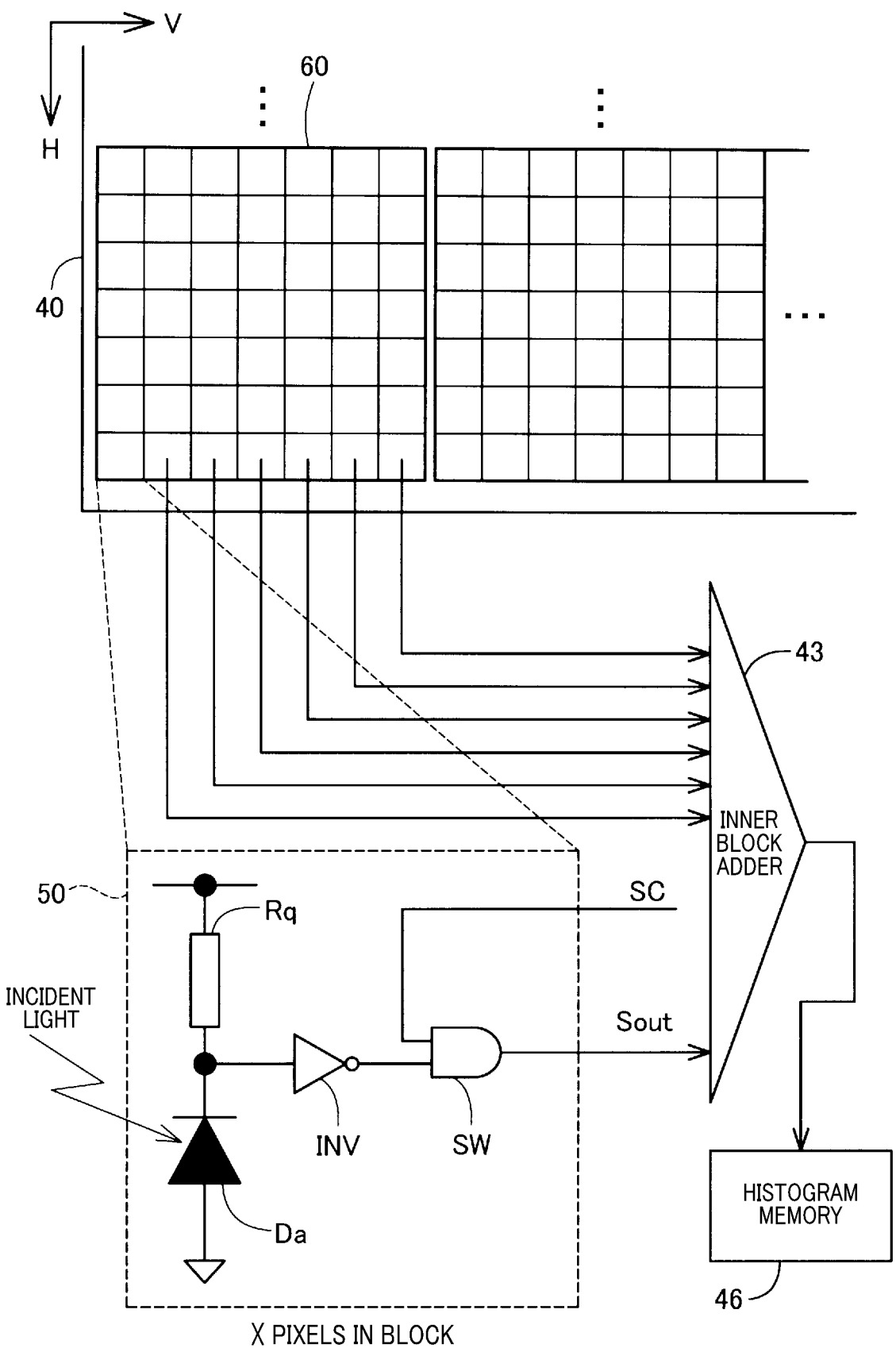
FIG. 13 is a circuit diagram schematically illustrating an example of how to calculate the sum of pulse signals output from a light receiving block illustrated in FIG. 12.
Figure 14:
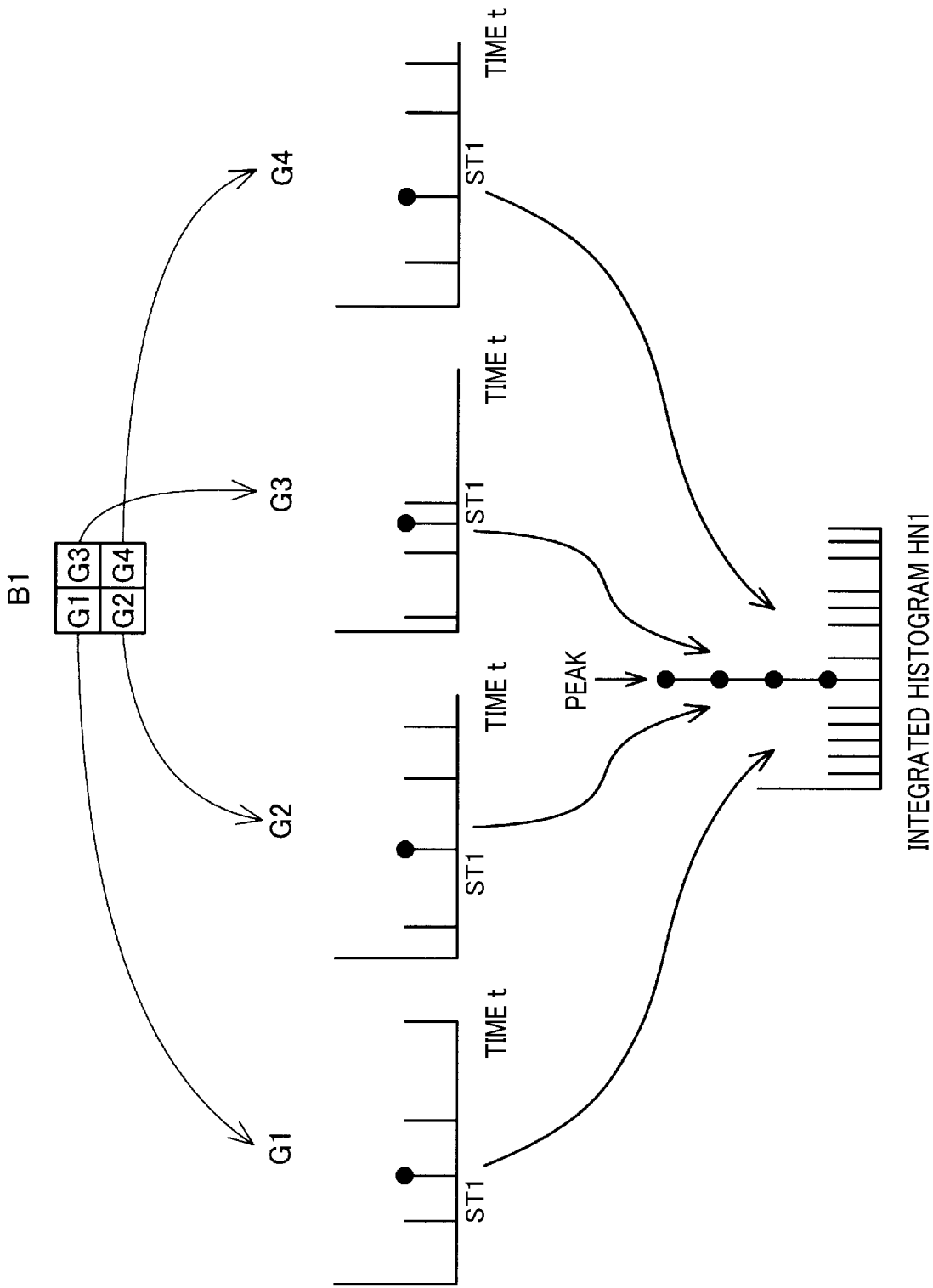
FIG. 14 is a timing chart schematically illustrating an example of how the second embodiment detects a peak intensity.

Schematic Configuration of Optical Distance Measuring Apparatus of Second Embodiment The following describes an example of the configuration of an optical distance measuring apparatus 20A according to the second embodiment with reference to FIGS. 12 to 14.

The structure and/or functions of the measuring apparatus 20A according to the second embodiment are mainly identical to those of the measuring apparatus 20 except for the following points. So, the following describes mainly the different points.

Specifically, the measuring apparatus 20A of the second embodiment is different from the measuring apparatus 20 of the first embodiment in the internal structure of a light receiving array 40A and the internal structure of a SPAD calculator 100A.

Referring to FIGS. 12 and 13, the light receiving array 40A is comprised of light receiving blocks 60, each of which is comprised of light receiving elements, i.e. avalanche photodiodes, 50, arranged as a two-dimensional array; the light receiving blocks 60 constitute the light detection region of the light receiving array 40A. That is, the light receiving array 40A is comprised of (H×V) blocks of the light receiving blocks 60. Each light receiving block 60 is comprised of (7×7) pixels of the light receiving elements 50. The internal structure of each of the light receiving elements 50 of the second embodiment is identical to that of the corresponding one of the light receiving elements 50 of the first embodiment. Because the optical size of each light receiving block 60 is set to be substantially identical to the optical size of the corresponding light receiving element 50 of the first embodiment, the optical size of each light receiving element 50 of the second embodiment is different from the optical size of the corresponding light receiving element 50 of the first embodiment. The number of light receiving element 50 incorporated in each light receiving block 60 can be freely set as long as it is equal to or more than 2. The horizontal number of pixels and the vertical number of pixels of the light receiving elements 50 can be freely set as long as at least one of the horizontal number of pixels and the vertical number of pixels of the light receiving elements 50 is set to be equal to or more than 2.

The light receiving array 40A is also comprised of inner block adders 43 provided for the respective light receiving blocks 60. Each of the inner block adders 43 calculates the sum of the light pulse signals Sout output from the respective light receiving elements 50 included in the corresponding one of the inner block adders 43.

The light receiving array 40A is further comprised of a histogram memory 46 that stores signals output from the respective light receiving blocks 60. That is, the histogram memory 46 has a capacity that can store the histograms of the respective (H×V) blocks 60.

As illustrated in FIG. 13, the output signals, i.e. the pulse signals, Sout output from all the light receiving elements 50 included in each light receiving block 60 are output to the inner block adder 43 so as to be added to each other. The added results of the respective inner block adders 43 are stored in the histogram memory 46. Specifically, the first embodiment detects the intensities of the reflected light pulses detected by each of the light receiving elements 50 N times over time to thereby statistically detect a peak intensity of the detected results (see FIG. 5).

In contrast, the second embodiment calculates, for each light receiving block 60, the sum of the intensities of the reflected light pulses simultaneously detected by the light receiving elements 50 to thereby detect a peak intensity of the sum of the intensities (see FIG. 14).

FIG. 14 schematically illustrates how a peak intensity is detected for each light receiving block B1. For simply describing how a peak intensity is detected for each light receiving block B1, the light receiving block B1 is comprised of four light receiving elements G1 to G4.

When a reflected light pulse based on reflection of the lase pulse by a specified portion of the target object OBJ is incident to the light receiving block B1, each of the light receiving elements G1 to G4 detects the reflected light pulse at a specific point of time ST1 (see black circle) in FIG. 14 in a time axis. Each of the light receiving elements G1 to G4 also detects ambient-light noise pulses at different timings in the time axis t.

Superimposing the signals output from the light receiving elements G1 to G4 with each other to thereby obtain an integrated histogram HN1 enables a peak intensity to be easily obtained. That is, while the first embodiment superimposes the detected pulse signals with each other over time, the second embodiment superimposes the detected pulse signals, which are spatially close to each other, with each other.

The example illustrated in FIG. 13 shows that the detected pulse signals of the respective (7×7) pixels of the light receiving elements 50 based on one laser pulse are superimposed with each other, making it possible to reduce time required to detect a peak intensity for each light receiving block 60.

The integral histogram 46 for each light receiving block 60, which includes a peak intensity, is stored in the histogram memory 46, so that the SPAD calculator 100A has no need of any structure for superimposing the detected pulse signals with each other. Thus, as illustrated in FIG. 12, the SPAD calculator 100A substantially includes only the peak detector 108 for detecting, based on the integral histogram HN1 for each of the (H×V) light receiving blocks 60, a peak intensity, i.e. a largest value, of the added results for the corresponding one of the (H×V) light receiving blocks 60.

Thus, like the first embodiment, the peak detector 108 is configured to read out the integrated histogram for each of the (H×V) light receiving blocks 60 stored in the histogram memory 46, and detect, for each of the (H×V) light receiving blocks 60, the peak intensity. In addition, the peak detector 108 calculates, based on the specific point ST1 of time of the peak intensity, time of flight, i.e. round-trip time, during which the laser pulse transmitted from the laser device 35 is propagated to the target object OBJ and, after being reflected by the target object OBJ, back to each of the (H×V) light receiving blocks 60.

In particular, the peak detector 108 is configured to measure, based on the time of flight for each of the (H×V) light receiving blocks 60, a distance of a corresponding portion of the target object OBJ relative to the corresponding one of the (H×V) light receiving blocks 60.

That is, like the first embodiment, the SPAD calculator 100A of the second embodiment serves as a measurement unit that measures a distance of a target object for each of the (H×V) light receiving blocks 60 based on the added results of the pulse signals Sout of the light receiving elements 50 in the corresponding (H×V) light receiving blocks 60.

As described above, the measuring apparatus 20A is configured to accurately identify, on the light detection region, i.e. the light sensitive surface, of the light receiving array 40A, the light receiving area in which the image RS based on the reflected light RS is actually formed. Then, the measuring apparatus 20A detects peak intensities of the reflected light RS in the identified light receiving area to thereby obtain the distance signals DCS, thus externally outputting the distance signals DCS. This configuration enables a distance of a target object OBJ to be measured with higher accuracy.

That is, even if the location of the image RS based on reflected light formed on the light detection region of the light receiving elements 50 is misaligned, the light-receiving area calibrating routine (see step S200 of FIG. 7 and steps S205 to S270 of FIG. 8) enables the light receiving area of the light detection region, in which the image of the reflected light is actually formed, to be easily identified. The identified light receiving area enables peaks intensities of pixels to be easily detected, thus preventing reduction in accuracy of measuring a distance of a target object OBJ.

In addition, the measuring apparatus 20A according to the second embodiment eliminates the need of superimposing the detected pulse signals with each other over time for generating an integral histogram, making it possible to reduce time needed to measure a distance of a target object OBJ.

The SPAD calculator 100A can be configured to successively obtain N measurement sets each including the signals output from each light receiving block 60, and to superimpose the N measurement sets with each other for each light receiving block 60. This makes it possible to further accurately detect a peak intensity of each light receiving block 60. This modification can reduce the number N as compared with the additional number N according to the first embodiment. This reduces time needed to measure a distance of a target object OBJ according to the first embodiment as compared with that according to the first embodiment.

Modifications

Each of the first and second embodiments can be freely modified within the scope of the present disclosure.

Each of the first and second embodiments is configured to perform the light-receiving area calibration subroutine before executing the distance measurement task, but can be configured to perform the light-receiving area calibration subroutine each time of executing the distance measurement task.

Each of the first and second embodiments is configured to perform the light-receiving area calibration subroutine without adjusting alignment of the optical system 30, but can be configured to (1) Detect a deviation of the location of an image based on reflected light in the light sensitive surface of the light receiving array 40 or 40A from an original location or a design-time adjusted location, which will be referred to as a default location (2) Measure the deviation to thereby correct, based on the detected deviation, the optical system 30 to a default alignment corresponding to the default location of the image For example, a mechanism M for correcting the default alignment.

The mechanism M can be provided to two-dimensionally move the location of the light receiving array 40 in a direction along the light receiving surface of the light receiving array 40, and the mechanism M can move the light receiving array 40 such that the location of the image based on reflected light is aligned with the default location. For example, the combination of a rack, i.e. a spur gear, a pinion gear, and a motor can easily constitute the mechanism M. Specifically, a rack is so mounted on the light receiving surface of the light receiving array 40 as to be two-dimensionally movable on the light receiving surface. A pinion gear rotatably joined to a rotating shaft of a motor is engaged with the rack. The motor, which is connected to the controller 80, is configured to rotate the pinion gear based on the deviation under control of the controller 80 to thereby easily adjust location of the light receiving array 40.

As another example, the mechanism M can be provided to move the location of the laser diode 35 and controllably connected to the controller 80. The mechanism M can move the laser diode 35 under control of the controller 80 such that the location of the image based on reflected light is aligned with the default location. As a further example, the angle of the mirror 31 can be adjusted such that the location of the image based on reflected light is aligned with the default location under control of the controller 80.

Additionally, the mechanism M can be provided to three-dimensionally move the location of the light receiving array 40 and controllably connected to the controller 80. If it is determined that the high-cumulative region AG is larger than its default size, it is determined that the light receiving array 40 is deviated from a predetermined focal location of the lens 36. Then, the controller 80 can cause the mechanism M to move the light receiving array 40 in the optical direction of the lens 36 to thereby adjust the size of the high-cumulative region AG to match with its default size.

Each of the first and second embodiments describes that the number of ambient noise pulses is constant independently of the direction of incident reflected light to the light receiving array 40, but the intensities or the number of ambient noise pulses may be changed in the vertical direction.

Figure 15:
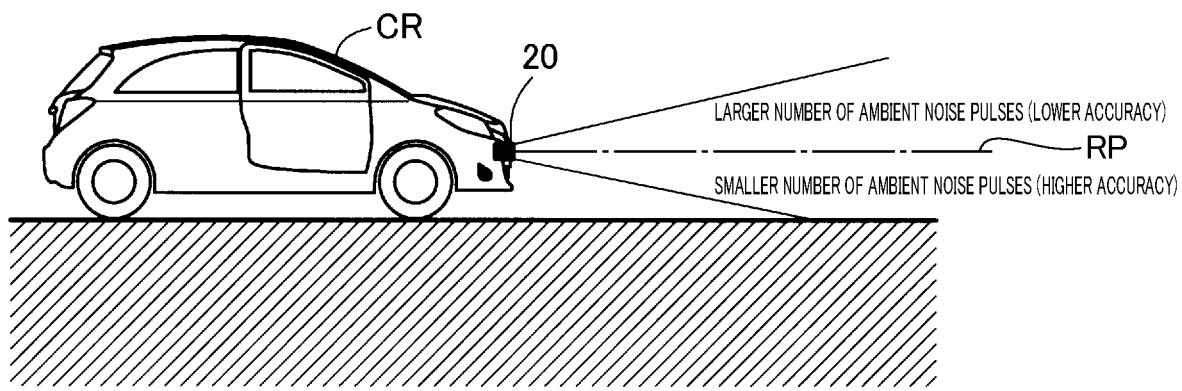
FIG. 15 is a schematic view illustrating different regions, one of which has the larger number of ambient noise pulses, the other of which has the smaller number of ambient noise pulses.

For example, as illustrated in FIG. 15, if the measuring apparatus 20 is mounted to the front end of a vehicle CR, there are a larger number of ambient noise pulses located above a reference plane RP passing through the mount position of the measuring apparatus 20 along the longitudinal direction of the vehicle CR, and there are a smaller number of ambient noise pulses located below the reference plane RP.

This therefore may result in lower accuracy of measuring a distance of a target object located in the upper side of the reference plane RP, and higher accuracy of measuring a distance of a target object located in the lower side of the reference plane RP.

Figure 16A:
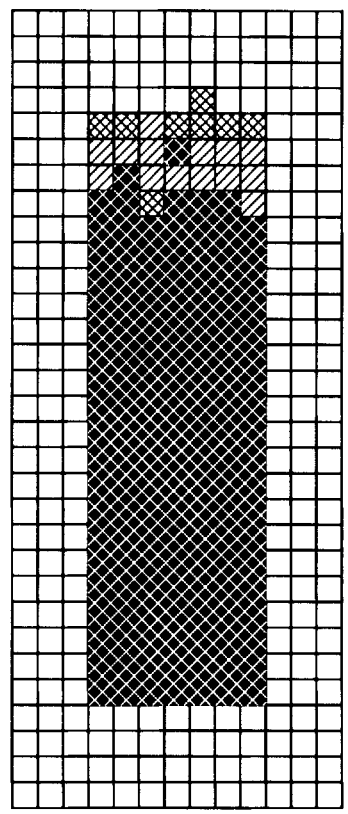
FIG. 16A is a diagram schematically illustrating a cumulative sum image with an upper portion whose identification accuracy deteriorates.

Execution of the light-receiving area calibration subroutine for the measuring apparatus 20 while the measuring apparatus 20 is in the situation illustrated in FIG. 15 therefore may reduce identification accuracy of the upper portion of the cumulative sum image SG in the frame memory FM (see FIG. 16A).

Figure 16B:
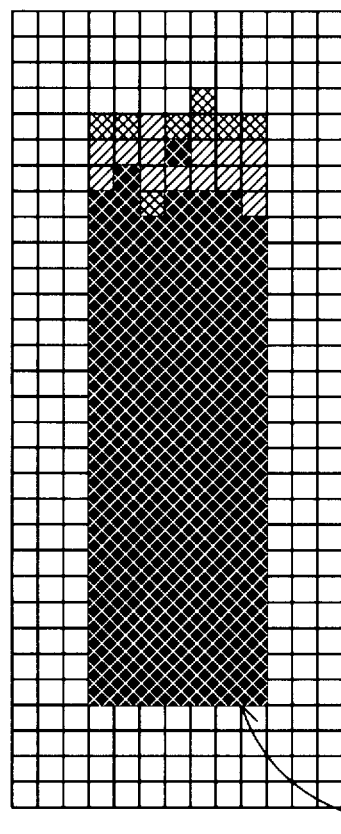
FIG. 16B is a diagram schematically illustrating how to determine a light receiving area based on the lower end of the cumulative sum image according to a modification of each of the first and second embodiments.
Figure 16C:
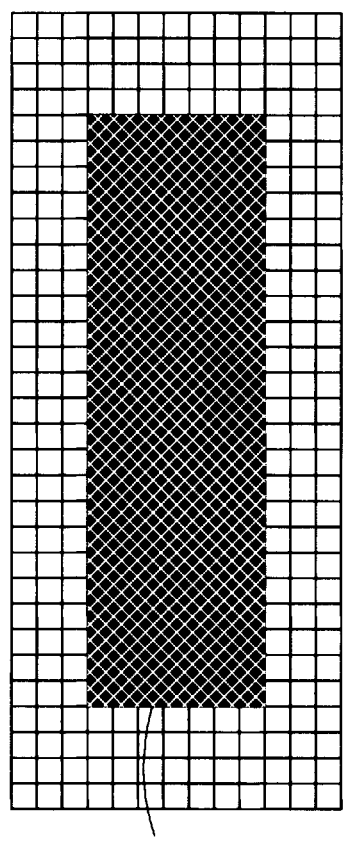
FIG. 16C is a diagram schematically illustrating a determined light receiving area according to the modification of each of the first and second embodiments.

For addressing such a situation, the measuring apparatus 20 can be modified to (1) Detect, based on a lower portion of the cumulative sum image SG located in the lower side of the reference plane RP in the frame memory FM, a lower portion of the light receiving area (2) Locate a previously prepared rectangular pixel field having the size of (P×Q) pixels on the frame memory FM such that the lower side of the pixel field is in alignment with the lower side of the light receiving area in the frame memory FM (see FIG. 16B), thus identifying the light receiving area (see FIG. 16C).

Similarly, if the measuring apparatus 20 is mounted to a vehicle, and there are a larger number of ambient noise pulses located below the reference plane RP, and there are a smaller number of ambient noise pulses located above the reference plane RP, the measuring apparatus 20 can be modified to determine the light receiving area based on an upper portion of the cumulative sum image SG located in the upper side of the reference plane RP in the frame memory FM. Additionally, if the measuring apparatus 20 is mounted to a vehicle, and there are a larger number of ambient noise pulses located at a first lateral space relative to the vehicle, and there are a smaller number of ambient noise pulses located at an opposing second lateral space relative to the vehicle, the measuring apparatus 20 can be modified to determine the light receiving area based on one left or right side portion of the cumulative sum image SG corresponding to the second lateral space in the frame memory FM.

Various types of the optical system 35 can be used. Each light receiving element (APD) 50 can be driven in the linear mode. High-sensitivity charge-coupled devices (CCD), high-sensitive C-MOS optical sensors, PIN photodiodes, or photon sensors with electron-bombarded multiplication can be used as the light receiving elements 50.

The light receiving elements 50 or the light receiving blocks 60 can be arranged to have a honeycomb geometry, or randomly arranged if the location of each element 50 or block 60 is identified.

The light receiving elements 50 in each light receiving block 60 can also be freely arranged so as to have a selected shape, such as a circular shape or a cross shape.

The optical system 30 is configured as a coaxial optical system, but can be configured as a non-coaxial optical system such that the transmission direction of a laser pulse is different from a retuning direction of reflected pulse.

Each of the first and second embodiments uses a single laser device 35 that outputs the laser light having a beam spread angle θ (see FIG. 2) along the direction of the rotating shaft of the motor 31, but can use laser devices, each of which outputs a single strong laser beam with a higher directional feature, and the laser devices can be arranged along the rotating shaft of the motor 31. The optical system 30 is configured to rotate the mirror 31 to thereby horizontally scan the scannable space, but to vertically scan or to scan both vertically and horizontally. The optical system 30 can be modified such that the plural laser devices 35 are two-dimensionally arranged with respectively different laser irradiating directions or such that the laser light is optically diffused. This modification of the optical system 30 enables the mirror 31 to be maintained to be unrotated, or eliminates the need of mirrors.

Superimposition of the detected pulse signals with each other is carried out in any one of a time domain or in a space domain, but superimposition of the detected pulse signals with each other can be carried out in both the time domain and the space domain with higher distance measurement accuracy.

Each of the first and second embodiments for example performs, as a statistical task, a task of generating a histogram of detected pulse signals, but can calculate a root-mean square situation based on the integrated histogram, and can eliminate peak intensities whose percentages is outside the range of 3σ. Each of the first and second embodiments can also be configured to eliminate abnormally higher peak intensities as compared with other peak intensities.

The functions of one element in each embodiment can be distributed as plural elements, and the functions that plural elements have can be combined into one element. At least part of the structure of each embodiment can be replaced with a known structure having the same function as the at least part of the structure of the corresponding embodiment. A part of the structure of each of the first and second embodiments can be eliminated. At least part of the structure of each of the first and second embodiments can be replaced with or added to the structure of the other of the first and second embodiments. At least part of the software structure of each embodiment can be replaced with an equivalent hardware structure, and at least part of the hardware structure of each embodiment can be replaced with an equivalent software structure. All aspects included in the technological ideas specified by the language employed by the claims constitute embodiments of the present disclosure.

An apparatus for performing a measurement task of optically measuring a distance of a target object according to the present disclosure includes a light transmission unit configured to perform transmission of measurement light to a predetermined measurement space in which the target object is located. The apparatus includes a light receiving unit comprising, in a light detection region thereof, a plurality of light receiving elements to which return light from the measurement space is incident. Each of the plurality of light receiving elements is configured to output an intensity signal based on a corresponding intensity of the return light. The return light includes reflected light reflected based on reflection of the measurement light by the target object. The apparatus includes an identifying unit configured to identify a light receiving area in the light detection region as a function of the intensity signals of the plurality of respective light receiving elements. The light receiving area is based on specified light receiving elements in the plurality of light receiving elements, and the specified light receiving elements are arranged to receive the reflected light. The apparatus includes a distance measuring unit configured to measure the distance of the target object in accordance with the intensity signals received by the specified light receiving elements.

For example, each of the plurality of light receiving elements is configured to stochastically output the intensity signal based on the corresponding intensity of the return light. The identifying unit is configured to perform a statistical task as a function of the output signals of the plurality of respective light receiving elements to thereby identify the light receiving area. PIN photodiodes or SPADs, each of which can stochastically output a signal based on reflected light incident thereto, can be used as the light receiving elements. CCDs or MOS sensors, each of which outputs a signal based on an intensity of reflected light incident thereto can be used as the light receiving elements.

The light transmission unit can be configured to perform, as the transmission of the measurement light to the predetermined measurement space, transmission of first measurement light to the predetermined measurement space, and transmission of second measurement light to the predetermined measurement space. Each of the plurality of light receiving elements can be configured to output, as the intensity signal, a first intensity signal based on a corresponding intensity of first return light from the measurement space, and output, as the intensity signal, a second intensity signal based on a corresponding intensity of second return light from the measurement space. The first return light can include light reflected based on reflection of the first measurement light by the target object, and the second return light can include light reflected based on reflection of the second measurement light by the target object. The identifying unit can be configured to perform, as the statistical task, a task of calculating a sum of the first intensity signals of each of the plurality of light receiving elements and the second intensity signals of a corresponding one of the plurality of light receiving elements to thereby obtain intensity peaks from the respective specified light receiving elements, and identify the light receiving area in accordance with an arrangement of the specified light receiving elements.

The light receiving unit can include a plurality of light receiving blocks, each of the plurality of light receiving blocks comprising the plurality of light receiving elements. The identifying unit can be configured to perform, as the statistical task, a task of calculating the sum of the intensity signals from the plurality of respective light receiving elements for each of the plurality of light receiving blocks to thereby obtain intensity peaks from specified light receiving blocks in the plurality of light receiving blocks, and identify the light receiving area in accordance with an arrangement of the specified light receiving blocks.

The light transmission unit can be configured to perform, as the transmission of the measurement light to the predetermined measurement space, transmission of first measurement light to the predetermined measurement space, and transmission of second measurement light to the predetermined measurement space. The identifying unit can be configured to obtain, based on the first measurement light, a first sum of the intensity signals from the plurality of respective light receiving elements for each of the plurality of light receiving blocks, obtain, based on the second measurement light, a second sum of the intensity signals from the plurality of respective light receiving elements for each of the plurality of light receiving blocks, and calculate a total sum of the first sum for each of the plurality of light receiving blocks and the second sum for the corresponding one of the plurality of light receiving blocks.

The identifying unit can be configured to obtain a first peak intensity based on the first intensity signals of each of the plurality of light receiving elements, obtain a second peak intensity based on the second intensity signals of each of the plurality of light receiving elements, and calculate a sum of the first peak intensity and the second peak intensity for each of the plurality of light receiving elements to thereby obtain an intensity distribution image comprised of pixels each having a corresponding one of the intensity peaks.

The light transmission unit can be configured to perform the transmission of a set of the first measurement light and the second measurement light a predetermined number of times. Each of the plurality of light receiving elements is configured to output a set of the first and second intensity signals of each of the plurality of light receiving elements for each of the predetermined number of times. The identifying unit is configured to generate, based on the set of the first and second intensity signals of each of the plurality of light receiving elements, the intensity distribution image for each of the predetermined number of times. Each of the intensity distribution images being comprised of first pixels each corresponding to one of the light receiving elements, each of the first pixels having a first pixel value including the intensity signal of a corresponding one of the light receiving elements. The identifying unit is configured to superimpose the intensity distribution images generated for the respective number of times with each other to thereby obtain a cumulative sum image. The cumulative sum image is comprised of second pixels respectively corresponding to the first pixels, each of the second pixels having the sum of the first pixel values of a corresponding one of the first pixels. The identifying unit is configured to identify, based on the cumulative sum image, the light receiving area.

The light transmission unit can be configured to perform transmission of the measurement light to the predetermined measurement space a predetermined number of times. Each of the plurality of light receiving elements can be configured to output the intensity signal based on the corresponding intensity of the return light for each of the predetermined number of times. The identifying unit can be configured to generate, based on the intensity signals of the plurality of respective light receiving elements, an intensity distribution image for each of the predetermined number of times. Each of the intensity distribution images can be comprised of first pixels each corresponding to one of the light receiving elements, each of the first pixels having a first pixel value including the intensity signal of a corresponding one of the light receiving elements. The identifying unit can be configured to superimpose the intensity distribution images generated for the respective number of times with each other to thereby obtain a cumulative sum image. The cumulative sum image being comprised of second pixels respectively corresponding to the first pixels. Each of the second pixels can have the sum of the first pixel values of a corresponding one of the first pixels. The identifying unit can be configured to identify, based on the cumulative sum image, the light receiving area.

In the apparatus according, an ambient light detector can be configured to detect an intensity of ambient light. The identifying unit can be configured to determine whether the intensity of the ambient light is equal to or larger than a predetermined intensity, and increase the predetermined number of times upon determining that the intensity of the ambient light is equal to or larger than the predetermined intensity.

The identifying unit can be configured to reduce, from each of the intensity distribution images, the detected intensity of the ambient light, and superimpose the intensity distribution images, from each of which the detected intensity of the ambient light has been reduced, with each other.

The cumulative sum image can have a predetermined edge. The identifying unit can be configured to determine, based on a previously determined size of the light receiving area and at least first part of an edge of the cumulative sum image, an edge of the light receiving area when at least one of (1) A second part, which is opposite to the first part, of the edge of the cumulative sum image having a lower one of the second pixel values (2) The second part of the edge of the cumulative sum image being closer to ambient light The plurality of light receiving elements can be arranged in rows and columns, and the identifying unit can be configured to calculate a sum of the intensity peaks for each row of the specified light receiving elements, calculate a sum of the intensity peaks for each column of the specified light receiving elements, and identify the light receiving area in accordance with an arrangement of each row of the specified light receiving elements and each column of the specified light receiving elements.

The identifying unit can be configured to perform the statistical task as a function of the output signal of each of the plurality of respective light receiving elements, and identify the light receiving area in accordance with (1) A result of the statistical task for each of the plurality of respective light receiving elements (2) A shape of an optical image formed on the light receiving area based on the reflected light The identifying unit can be configured to perform an identification task of identifying the light receiving area at any one of the following first (i) to ninth (ix) timings:

(i) The first timing when the apparatus is started (ii) The second timing that cyclically occurs while the apparatus is performing the measurement task (iii) The third timing when the apparatus is terminated (iv) The fourth timing being any timing while the measuring apparatus 20 is not executing the distance measurement task, for example, when the vehicle is stopped (v) The fifth timing indicative of each time the apparatus starts the identification task (vi) The sixth timing indicative of a temporarily allowable timing during execution of the measurement task (vii) The seventh timing when calibration of the light receiving area is instructed by a user (viii) The eighth timing when it is determined that the target object is located within a predetermined distance range from the apparatus (ix) The ninth timing when an external calibration instruction is input to the apparatus at factory adjustment or periodic inspection of the apparatus The identifying unit can be configured to calibrate the identified light receiving area. The distance measuring unit can be configured to measure the distance of the target object relative to the apparatus in accordance with at least part of the intensity signals received by the respective specified light receiving elements, the at least part of the intensity signals being included in the calibrated light receiving area.

The measuring apparatus 20 can be installed in one of other mobile members, such as air crafts including drones, ships, robots, and other slimier machines.

While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those having ordinary skill in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An apparatus for performing a measurement task of optically measuring a distance of a target object, the apparatus comprising:
    a light transmission unit configured to perform transmission of first measurement light to a predetermined measurement space in which the target object is located, and transmission of second measurement light to the predetermined measurement space;
    a light receiving unit comprising, in a light detection region thereof, a plurality of light receiving elements to which return light from the measurement space is incident, each of the plurality of light receiving elements being configured to:
    stochastically output a first intensity signal based on a corresponding intensity of first return light from the measurement space as the return light; and
    stochastically output a second intensity signal based on a corresponding intensity of second return light from the measurement space as the return light,
    the first return light including first reflected light reflected based on reflection of the first measurement light by the target object,
    the second return light including second reflected light reflected based on reflection of the second measurement light by the target object;
    the light detection region including a light receiving area that is based on specified light receiving elements included in the plurality of light receiving elements, the specified light receiving elements being arranged to receive the first reflected light and the second reflected light;
    an identifying unit configured to:
        perform, as a statistical task, a task of calculating a sum of the first intensity signals of each of the plurality of light receiving elements and the second intensity signals of a corresponding one of the plurality of light receiving elements to thereby obtain intensity peaks from the respective specified light receiving elements; and
        identify the light receiving area in accordance with an arrangement of the specified light receiving elements; and
    a distance measuring unit configured to measure the distance of the target object in accordance with the intensity signals received by the specified light receiving elements.

2. An apparatus for performing a measurement task of optically measuring a distance of a target object, the apparatus comprising:
    a light transmission unit configured to perform transmission of measurement light to a predetermined measurement space in which the target object is located;
    a light receiving unit comprising, in a light detection region thereof, a plurality of light receiving blocks, each of the light receiving blocks comprising a plurality of light receiving elements to which return light from the measurement space is incident, each of the plurality of light receiving elements being configured to stochastically output an intensity signal based on a corresponding intensity of the return light, the return light including reflected light reflected based on reflection of the measurement light by the target object;
    an identifying unit configured to perform a statistical task as a function of the output signals of the plurality of respective light receiving elements to thereby identify a light receiving area in the light detection region, the light receiving area being based on specified light receiving elements in the plurality of light receiving elements, the specified light receiving elements being arranged to receive the reflected light; and a distance measuring unit configured to measure the distance of the target object in accordance with the intensity signals received by the specified light receiving elements, wherein:

the identifying unit is configured to:
  perform, as the statistical task, a task of calculating the sum of the intensity signals from the plurality of respective light receiving elements for each of the plurality of light receiving blocks to thereby obtain intensity peaks from specified light receiving blocks in the plurality of light receiving blocks; and
  identify the light receiving area in accordance with an arrangement of the specified light receiving blocks.

3. The apparatus according to claim 2, wherein:

the light transmission unit is configured to perform, as the transmission of the measurement light to the predetermined measurement space, transmission of first measurement light to the predetermined measurement space, and transmission of second measurement light to the predetermined measurement space; and the identifying unit is configured to:
  obtain, based on the first measurement light, a first sum of the intensity signals from the plurality of respective light receiving elements for each of the plurality of light receiving blocks;
  obtain, based on the second measurement light, a second sum of the intensity signals from the plurality of respective light receiving elements for each of the plurality of light receiving blocks; and
  calculate a total sum of the first sum for each of the plurality of light receiving blocks and the second sum for the corresponding one of the plurality of light receiving blocks.

4. The apparatus according to claim 1, wherein:

the identifying unit is configured to:
  obtain a first peak intensity based on the first intensity signals of each of the plurality of light receiving elements;
  obtain a second peak intensity based on the second intensity signals of each of the plurality of light receiving elements; and
  calculate a sum of the first peak intensity and the second peak intensity for each of the plurality of light receiving elements to thereby obtain an intensity distribution image comprised of pixels each having a corresponding one of the intensity peaks.

5. An apparatus for performing a measurement task of optically measuring a distance of a target object, the apparatus comprising:

a light transmission unit configured to perform transmission of first measurement light to a predetermined measurement space in which the target object is located, and transmission of second measurement light to the predetermined measurement space;

a light receiving unit comprising, in a light detection region thereof, a plurality of light receiving elements to which return light from the measurement space is incident, each of the plurality of light receiving elements being configured to:
  stochastically output a first intensity signal based on a corresponding intensity of first return light from the measurement space as the return light; and
  stochastically output a second intensity signal based on a corresponding intensity of second return light from the measurement space as the return light, the first return light including first reflected light reflected based on reflection of the first measurement light by the target object, the second return light including second reflected light reflected based on reflection of the second measurement light by the target object, the light detection region including a light receiving area that is based on specified light receiving elements included in the plurality of light receiving elements, the specified light receiving elements being arranged to receive the first reflected light and the second reflected light;

an identifying unit configured to:

perform, as a statistical task, a task of calculating a sum of the first intensity signals of each of the plurality of light receiving elements and the second intensity signals of a corresponding one of the plurality of light receiving elements to thereby obtain intensity peaks from the respective specified light receiving elements; and
  identify the light receiving area in accordance with an arrangement of the specified light receiving elements; and a distance measuring unit configured to measure the distance of the target object in accordance with the intensity signals received by the specified light receiving elements, wherein:

the identifying unit is configured to:
  obtain a first peak intensity based on the first intensity signals of each of the plurality of light receiving elements;
  obtain a second peak intensity based on the second intensity signals of each of the plurality of light receiving elements; and
  calculate a sum of the first peak intensity and the second peak intensity for each of the plurality of light receiving elements to thereby obtain an intensity distribution image comprised of pixels each having a corresponding one of the intensity peaks;

the light transmission unit is configured to perform the transmission of a set of the first measurement light and the second measurement light a predetermined number of times;

each of the plurality of light receiving elements is configured to:
  output a set of the first and second intensity signals of each of the plurality of light receiving elements for each of the predetermined number of times; and the identifying unit is configured to:
  generate, based on the set of the first and second intensity signals of each of the plurality of light receiving elements, the intensity distribution image for each of the predetermined number of times, each of the intensity distribution images being comprised of first pixels each corresponding to one of the light receiving elements, each of the first pixels having a first pixel value including the intensity signal of a corresponding one of the light receiving elements;

superimpose the intensity distribution images generated for the respective number of times with each other to thereby obtain a cumulative sum image, the cumulative sum image being comprised of second pixels respectively corresponding to the first pixels, each of the second pixels having the sum of the first pixel values of a corresponding one of the first pixels; and identify, based on the cumulative sum image, the light receiving area.

6. The apparatus according to claim 5, further comprising:
an ambient light detector configured to detect an intensity of ambient light,
wherein:
the identifying unit is configured to:
  determine whether the intensity of the ambient light is equal to or larger than a predetermined intensity; and
  increase the predetermined number of times upon determining that the intensity of the ambient light is equal to or larger than the predetermined intensity.

7. The apparatus according to claim 6, wherein:
the identifying unit is configured to:
  reduce, from each of the intensity distribution images, the detected intensity of the ambient light; and
  superimpose the intensity distribution images, from each of which the detected intensity of the ambient light has been reduced, with each other.

8. The apparatus according to claim 5, wherein:
the cumulative sum image has a predetermined edge; and
the identifying unit is configured to:
  determine, based on a previously determined size of the light receiving area and at least a first part of an edge of the cumulative sum image, an edge of the light receiving area when at least one of:
    a second part, which is opposite to the first part, of the edge of the cumulative sum image having a lower one of the second pixel values; and
    the second part of the edge of the cumulative sum image being closer to ambient light.

9. The apparatus according to claim 1, wherein:
the plurality of light receiving elements are arranged in rows and columns; and
the identifying unit is configured to:
  calculate a sum of the intensity peaks for each row of the specified light receiving elements;
  calculate a sum of the intensity peaks for each column of the specified light receiving elements; and
  identify the light receiving area in accordance with an arrangement of each row of the specified light receiving elements and each column of the specified light receiving elements.

10. The apparatus according to claim 1, wherein:
the identifying unit is configured to:
  perform the statistical task as a function of the output signal of each of the plurality of respective light receiving elements; and
  identify the light receiving area in accordance with:
    a result of the statistical task for each of the plurality of respective light receiving elements; and
    a shape of an optical image formed on the light receiving area based on the reflected light.

11. The apparatus according to claim 1, wherein:
the identifying unit is configured to:
  perform an identification task of identifying the light receiving area at any one of the following first (i) to ninth (ix) timings:
    (i) the first timing when the apparatus is started;
    (ii) the second timing that cyclically occurs while the apparatus is performing the measurement task;
    (iii) the third timing when the apparatus is terminated;
    (iv) the fourth timing when it is determined that apparatus has no need of executing the distance measurement task;
    (v) the fifth timing indicative of each time the apparatus starts the identification task;
    (vi) the sixth timing indicative of a temporarily allowable timing during execution of the measurement task;
    (vii) the seventh timing when calibration of the light receiving area is instructed by a user;
    (viii) the eighth timing when it is determined that the target object is located within a predetermined distance range from the apparatus; and
    (ix) the ninth timing when an external calibration instruction is input to the apparatus at factory adjustment or periodic inspection of the apparatus; and
  calibrate the identified light receiving area; and
the distance measuring unit is configured to measure the distance of the target object relative to the apparatus in accordance with at least part of the intensity signals received by the respective specified light receiving elements, the at least part of the intensity signals being included in the calibrated light receiving area.

12. A method of optically measuring a distance of a target object, the method comprising:
performing transmission of first measurement light to a predetermined measurement space in which the target object is located, and transmission of second measurement light to the predetermined measurement space;
causing, in a light detection region thereof, each of plurality of light receiving elements, to which return light from the measurement space is incident, to:
  stochastically output a first intensity signal based on a corresponding intensity of first return light; and
  stochastically outputting a second intensity signal based on a corresponding intensity of second return light,
the first return light including first reflected light reflected based on reflection of the first measurement light by the target object,
the second return light including second reflected light reflected based on reflection of the second measurement light by the target object,
the light detection region including a light receiving area that is based on specified light receiving elements included in the plurality of light receiving elements, the specified light receiving elements being arranged to receive the first reflected light and the second reflected light;
performing, as a statistical task, a task of calculating a sum of the first intensity signals of each of the plurality of light receiving elements and the second intensity signals of a corresponding one of the plurality of light receiving elements to thereby obtain intensity peaks from the respective specified light receiving elements;
identifying the light receiving area in accordance with an arrangement of the specified light receiving elements; and
measuring the distance of the target object in accordance with the intensity signals received by the specified light receiving elements.

13. The method according to claim 12, wherein:
identifying the light receiving area comprises:
- obtaining a first peak intensity based on the first intensity signals of each of the plurality of light receiving elements;
- obtaining a second peak intensity based on the second intensity signals of each of the plurality of light receiving elements; and
- calculating a sum of the first peak intensity and the second peak intensity for each of the plurality of light receiving elements to thereby obtain an intensity distribution image comprised of pixels each having a corresponding one of the intensity peaks;

performing transmission of the first measurement light and the second measurement light comprises performing the transmission of a set of the first measurement light and the second measurement light a predetermined number of times;

each of the plurality of light receiving elements are caused to output a set of the first and second intensity signals for each of the predetermined number of times; and identifying the light receiving area comprises
- generating, based on the set of the first and second intensity signals of each of the plurality of light receiving elements, the intensity distribution image for each of the predetermined number of times, each of the intensity distribution images being comprised of first pixels each corresponding to one of the light receiving elements, each of the first pixels having a first pixel value including the intensity signal of a corresponding one of the light receiving elements;

superimposing the intensity distribution images generated for the respective number of times with each other to thereby obtain a cumulative sum image, the cumulative sum image being comprised of second pixels respectively corresponding to the first pixels, each of the second pixels having the sum of the first pixel values of a corresponding one of the first pixels; and identifying, based on the cumulative sum image, the light receiving area.

* * * * *